US012605663B2

(12) United States Patent
Marshall

(10) Patent No.: US 12,605,663 B2
(45) Date of Patent: Apr. 21, 2026

(54) MULTI-STAGE COALESCING FILTER

(71) Applicant: WALKER FILTRATION LTD., Tyne and Wear (GB)

(72) Inventor: Philip Marshall, Tyne and Wear (GB)

(73) Assignee: WALKER FILTRATION LTD., Tyne and Wear (GB)

( * ) Notice: Subject to any disclaimer, the term of this patent is extended or adjusted under 35 U.S.C. 154(b) by 363 days.

(21) Appl. No.: 18/315,820

(22) Filed: May 11, 2023

(65) Prior Publication Data

US 2023/0372853 A1 Nov. 23, 2023

(30) Foreign Application Priority Data

May 17, 2022 (GB) ...................................... 2207194

(51) Int. Cl.
    *B01D 46/00* (2022.01)
    *B01D 46/24* (2006.01)
    (Continued)

(52) U.S. Cl.
    CPC ......... *B01D 46/0031* (2013.01); *B01D 46/24* (2013.01); *B01D 46/4272* (2013.01); *B01D 46/64* (2022.01); *B01D 2273/10* (2013.01)

(58) Field of Classification Search
None
See application file for complete search history.

(56) References Cited

U.S. PATENT DOCUMENTS 3,527,027 A 9/1970 Evert et al.
3,891,417 A * 6/1975 Wade ................ B01D 46/2411
96/139

(Continued)

FOREIGN PATENT DOCUMENTS

BR 102015025126 A2 4/2017
DE 3909402 A1 9/1990
(Continued)

OTHER PUBLICATIONS

EPO Partial Search Report, Application No. 23171808.1, European Patent Office, dated Aug. 1, 2023, 10 pages.
(Continued)

*Primary Examiner* — Brit E. Anbacht
(74) *Attorney, Agent, or Firm* — Quarles & Brady LLP

(57) ABSTRACT

The present invention provides a multi-stage coalescing filter for separating coalesced liquid from an aerosol-containing gas stream. The multi-stage coalescing filter includes an end cap having a chamber formed within and a plurality of coaxial, nested, tubular filter elements supported upright on the end cap. Pairs of successive filter elements are spaced from each other such that the end cap between pairs of successive filter elements forms respective annular sumps for collection of coalesced liquid separated by the filter elements from the aerosol-containing gas stream as it passes radially through the nested filter elements. The chamber has one or more inlets in fluid communication with the or each sump for receiving the coalesced liquid from the sump, and further has one or more outlets for guiding the received coalesced liquid out of the filter. The chamber houses a porous element which is configured to saturate under contact with the received coalesced liquid so as to allow the received coalesced liquid to flow through the porous element to the outlet while simultaneously preventing the aerosol-containing gas stream from passing through the chamber to bypass the nested filter elements.

13 Claims, 17 Drawing Sheets

(51) Int. Cl.
B01D 46/42 (2006.01)
B01D 46/64 (2022.01)

(56) References Cited

U.S. PATENT DOCUMENTS

| | | | | |
|---|---|---|---|---|
| 6,309,436 B1 * | 10/2001 | Holch | ................. | B01D 46/003 |
| | | | | 55/482 |
| 2012/0144789 A1 * | 6/2012 | Schnacke | .......... | B01D 46/2411 |
| | | | | 55/482 |
| 2020/0224649 A1 * | 7/2020 | Biebricher | ............ | B01D 46/00 |
| 2021/0069625 A1 | 3/2021 | Nelson | | |
| 2023/0372853 A1 * | 11/2023 | Marshall | ........... | B01D 46/0031 |
| 2024/0198285 A1 * | 6/2024 | Nakamoto | ............ | B01D 39/12 |
| 2025/0290513 A1 * | 9/2025 | Springl | ................ | F04C 29/026 |

FOREIGN PATENT DOCUMENTS

| | | |
|---|---|---|
| DE | 3806756 C2 | 12/1996 |
| DE | 19621935 A1 | 12/1997 |
| EP | 3804834 A1 | 5/2019 |
| JP | H0253117 U | 4/1990 |
| WO | WO 2013/019643 A2 | 2/2013 |
| WO | WO-2019/227188 A1 | 12/2019 |

OTHER PUBLICATIONS

EPO Extended Search Report, Application No. 23171808.1, European Patent Office, dated Nov. 2, 2023, 9 pages.
UKIPO Search Report, GB Application No. 2207194.8, dated Nov. 18, 2022, 4 pages.
EPO Extended Search Report, Application No. 25154175.1, European Patent Office, Mar. 31, 2025, 7 pages.

* cited by examiner

MULTI-STAGE COALESCING FILTER

This application claims priority from GB 2207194.8 filed May 17, 2022, the contents and elements of which are herein incorporated by reference for all purposes.

FIELD OF THE INVENTION

The present invention relates to a multi-stage coalescing filter for separating coalesced liquid from an aerosol-containing gas stream.

BACKGROUND

Coalesced liquid separators are commonly used to separate coalesced liquid, e.g. ammonia, water, and/or oil from an aerosol-containing gas stream such as a compressed or uncompressed airflow and/or a hydrogen gas stream. Oil separators are an example of coalesced liquid separators, commonly used to separate oil from airflows in air compressors and pumps such as vacuum pumps and cryo pumps. Oil separation can reduce contamination of the airflows and enable recycling of the separated oil, thereby improving reliability and cost efficiency of the pump/compressor.

Oil separators where oil is passed through one or a plurality of filter units are known. For example, a conventional oil separator is disclosed in US 2012/0144789 and is briefly described herein with reference to FIG. 1.

The oil separator of FIG. 1 comprises an outer housing 10 having a housing flange 12 and a housing lid 14 provided as a cylindrical bell and removably mounted on the flange. The housing is rotationally symmetrical relative to a longitudinal axis 16. An airflow enters through a centrally located inlet 18 formed in the flange and exits through a centrally located outlet 20 formed in the housing lid.

The oil separator has a multi-stage coalescing filter including two cylindrical filter elements (i.e. an inner 26 and an outer 28 element). The filter elements are detachably mounted onto the flange 12 by insertion into respective annular indentations 34, 36. A diameter of the inner filter element 26 is smaller than the diameter of the outer filter element 28, such that the two elements are nested, thereby providing a gap for liquid (e.g. oil) drainage and gas transfer between the filter elements. Thus, multi-stage coalescing filtration can be achieved. In use, the oil-containing airflow enters the housing 10 through the inlet 18 and flows radially outward through the filter elements 26, 28 before exiting the housing through the outlet 20. As the airflow passes through the filter elements, the filter elements separate and retain oil from the airflow. Under the influence of gravity, the separated oil runs down outer sides of the filter elements and accumulates in respective annular grooves 38, 40 formed in the flange. The grooves are in fluid communicated with respective oil passages 42, 44 entering a common channel (not shown) through which the separated oil can be returned to a collection point, e.g. a compressor or a vacuum pump.

A problem arises when the gas stream can follow the same flow path as the separated coalesced liquid, thereby bypassing the filter elements (i.e. aerosol bypass). This can cause the coalesced liquid separator to function less reliably and/or efficiently.

Thus, it is desirable to provide a multi-stage coalescing filter which can reliably separate coalesced liquid from an aerosol-containing gas stream while simultaneously preventing the gas stream from bypassing the filter elements.

SUMMARY OF THE INVENTION

In a first aspect, the present invention provides a multi-stage coalescing filter for separating coalesced liquid from an aerosol-containing gas stream, the multi-stage coalescing filter including:

an end cap having a chamber formed within; and a plurality of coaxial, nested, tubular filter elements supported upright on the end cap;

wherein:

pairs of successive filter elements are spaced from each other such that the end cap between pairs of successive filter elements forms respective annular sumps for collection of coalesced liquid separated by the filter elements from the aerosol-containing gas stream as it passes radially through the nested filter elements;

the chamber has one or more inlets in fluid communication with the or each sump for receiving the coalesced liquid from the sump, and further has one or more outlets for guiding the received coalesced liquid out of the filter; and the chamber houses a porous element which is configured to saturate under contact with the received coalesced liquid so as to allow the received coalesced liquid to flow through the porous element to the outlet while simultaneously preventing the aerosol-containing gas stream from passing through the chamber to bypass the nested filter elements.

Advantageously, the saturable porous element can reliably prevent aerosol bypass via the chamber, while simultaneously allowing the received coalesced liquid (e.g. oil) to flow to the outlet via capillary action in the porous element. Thus, it can be ensured that the coalesced liquid is reliably separated from the aerosol-containing gas stream and the separated coalesced liquid can be returned to a collection point such as a pump/compressor, e.g. via scavenge lines, thereby recycling it. Therefore, the present multi-stage coalescing filter can provide reliable coalesced liquid separation combined with improved efficiency.

A sump side of the or each inlet may be fitted with a pre-filter element for purifying the separated coalesced liquid before it enters the chamber. Conveniently, such a pre-filter element can aid the purification of the coalesced liquid separated from the gas stream by the filter elements prior to its return to a collection point, e.g. a compressor or a vacuum pump. For example, the pre-filter element may be mounted across an orifice of an orifice-containing part that is detachably attached to the sump side of a respective inlet of the chamber. In this way, the pre-filter element can be easily replaced or cleaned as needed.

The chamber may have plural inlets and/or outlets arranged in respective circumferential rows. Thus, the inlets and/or outlets can be correspondingly arranged around the respective tubular filter elements to receive the coalesced liquid from the or each sump.

The end cap may comprise a bottom portion which defines a floor of the chamber and the one or more outlets, and a top portion which defines a ceiling of the chamber and the one or more inlets, the top portion being removably couplable to the bottom portion to allow location of the porous element in the chamber. Advantageously, this arrangement facilitates end cap assembly and access to the porous element. For example, the porous element can be installed to the end cap or accessed, e.g. for maintenance purposes, by removing the top portion of the end cap to expose the chamber.

The floor and/or ceiling of the chamber may include one or more projections, such as ribs, extending into the chamber. Typically the projections are annular. When there are plural projections, they may be radially spaced. When the porous element is formed of a compressible material, e.g. a foam, the projections can create pinch points which compress the porous element at selected locations, thereby decreasing an amount of coalesced liquid required to saturate the porous element at these locations. Thus, these selected locations can quickly saturate when the coalesced liquid first comes into contact with the porous element to act as gas stoppers to reduce the risk of aerosol bypass during these initial stages of coalesced liquid drainage through the chamber.

The multi-stage coalescing filter may have just two nested tubular filter elements and a single annular sump.

Alternatively, however, the multi-stage coalescing filter may have three or more nested tubular filter elements and a plurality of annular sumps. Then, one option for the chamber is to be a single undivided space which receives coalesced liquid from all the sumps. The single chamber in this case has one or more inlets from each sump. Another option is for the chamber to be divided into separate (typically annular) sub-chambers which receive coalesced liquid from respective sumps. In the latter case, each sub-chamber has its own one or more inlets and outlets, and the porous element is also formed as separate sub-elements which are respectively housed in the sub-chambers.

The end cap may provide a respective pair of annular side walls for the or each sump, the side walls extending up opposing sides of the respective pair of successive tubular filter elements to isolate the coalesced liquid collected in the sump from the filter elements. Advantageously, this can ensure that coalesced liquid separated by the filter elements does not return to the filter elements to contaminate them and reduce filtration efficiency.

The annular side walls may have different heights. For example, when the filter is configured for an aerosol-containing gas stream that passes radially outwardly through the nested filter elements, the outer side wall of each sump can be higher than inner side wall. Advantageously, the separated coalesced liquid can thus accumulate in the respective sump but is primarily prevented from contacting and saturating the downstream filter element and thereby reducing its filtration efficiency. Conversely, when the filter is configured for an aerosol-containing gas stream that passes in the opposite direction radially inwardly through the nested filters, the inners side wall of each sump can be higher than the outer side wall to achieve the same effect. When a pre-filter element is fitted to the or each inlet, as described above, a height of the pre-filter element may be less than the height of the shorter annular side wall.

When the end cap comprises a bottom portion and a top portion, one of the annular side walls of a given sump may be formed by the top portion and the other of the annular side walls of the given sump may be formed by the bottom portion. Advantageously, this can enable the relative height difference between the two annular side walls to be changed simply by replacing the top portion of the end cap. However, alternatively, both of the annular side walls of at least one of the sumps may be formed by the top portion. Particularly when there are plural annular sumps, this can simplify the structure of the end cap.

The end cap of the first aspect may be a first end cap having a central port for communicating the aerosol-containing gas stream with the inside of the innermost tubular filter element, and the multi-stage coalescing filter may further have a second end cap at the opposite ends of the tubular filter elements to the first end cap to close off said opposite ends. When the filter is configured for an aerosol-containing gas stream that passes radially outwardly through the nested filter elements, the central port receives the aerosol-containing gas stream as an incoming gas stream, and when the filter is configured for an aerosol-containing gas stream that passes radially inwardly through the nested filter elements, the central port receives the aerosol-containing gas stream as an outgoing aerosol-containing gas stream. Either way, the first end cap and the second end cap ensure that the aerosol-containing gas stream passes as intended through the filter elements and the central port.

The second end cap may be formed as a single component which closes off all the opposite ends, or as several sub-components which close off respective opposite ends.

Alternatively, the end cap of the first aspect may be a first end cap which closes off a central bore of the innermost tubular filter element to gas flow. In this case, the multi-stage coalescing filter may further have a second end cap at the opposite ends of the tubular filter elements to the first end cap to close off said opposite ends except for a central port formed in the second end cap for communicating the aerosol-containing gas stream with the inside of the innermost tubular filter element. Again, when the filter is configured for an aerosol-containing gas stream that passes radially outwardly through the nested filter elements, the central port receives the aerosol-containing gas stream as an incoming gas stream, and when the filter is configured for an aerosol-containing gas stream that passes radially inwardly through the nested filter elements, the central port receives the aerosol-containing gas stream as an outgoing aerosol-containing gas stream. In this alternative, however, separated coalesced liquid may accumulate in a central sump formed at the base of the central bore, the first end cap having a liquid-only escape route from the central sump. For example, the escape route can be an inlet to the chamber housing the porous element, or an inlet to a further chamber housing a further porous element and having an outlet therefrom. Either way, the escape route is configured to allow coalesced liquid to be guided out of the filter while simultaneously preventing the aerosol-containing gas stream from bypassing the nested filter elements. The sump side of the inlet may be fitted with a pre-filter element as discussed above.

The porous element may be formed of any material or any combination of materials which is saturable and can reliably allow the received coalesced liquid to flow through it via capillary action to the outlets while simultaneously preventing the aerosol-containing gas stream from bypassing the nested filter elements. Thus the material of the porous element can be selected to control its porosity and saturability as required. For example, the porous element may be formed of any one or any combination of: glass fibre medium, synthetic fibre matrix, non-woven material, foam, and sintered material, such as sintered plastic. If using glass fibre media to form the filter elements and the porous element, selection of a suitable grade for the porous element can be informed by the choice of glass fibre media for the filter elements. A foam porous element can advantageously be compressed to more completely fill the chamber, thereby further reducing a risk of aerosol bypass. Sintered material, e.g. sintered plastic, such as a commercially available product e.g. available from Porvair™, generally have well-defined pore sizes which allow reliable control of coalesced liquid flow rates through the porous element at a range of differential pressures.

In a second aspect, the present invention provides a multi-stage coalescing filter for separating coalesced liquid from an aerosol-containing gas stream, the multi-stage coalescing filter including:

a plurality of coaxial, nested, tubular filter elements; and an end cap providing a support element that retains ends of the filter elements;

wherein:

pairs of successive filter elements are spaced from each other, the end cap between pairs of successive filter elements providing respective paths for a flow of coalesced liquid separated by the filter elements from the aerosol-containing gas stream as it passes radially through the nested filter elements;

the end cap further forms a reservoir for collecting the separated flow of coalesced liquid from the or each path; and the reservoir includes a float valve operable to open a drainage outlet for the oil from the reservoir when a level of coalesced liquid in the reservoir reaches or exceeds a predetermined level and to close the drainage outlet when the level of coalesced liquid in the reservoir falls below the predetermined level.

Advantageously, the float valve can act as an air seal to prevent aerosol bypass via the drainage outlet, while simultaneously allowing the separated coalesced liquid (e.g. oil) to flow through the drainage outlet. Thus, it helps to ensure that the coalesced liquid is reliably separated from the aerosol-containing gas stream and the separated coalesced liquid can be returned to a collection point such as a pump/compressor, e.g. via scavenge lines, thereby recycling it. Therefore, the present multi-stage coalescing filter can provide reliable coalesced liquid separation combined with improved efficiency.

The float valve may be configured such that, when there is no pressure differential across the drainage outlet and the reservoir is empty of coalesced liquid, the drainage outlet is closed. Float valves for draining coalesced liquid separator housings containing conventional filters for compressed air applications are typically biased to open the drainage outlet when there is no pressure differential across the drainage outlet (i.e. the filter is not in use) and the reservoir is empty of coalesced liquid. This is because, in use, the pressure inside the housing becomes higher than outside the housing (the outside pressure generally being atmospheric pressure), and thus the float valve needs to be biased to an open position to counteract the pressure differential acting across the housing. In contrast, the end cap (with its reservoir) and the filter elements of the multi-stage coalescing filter of the second aspect are typically deployed inside a separator housing, and thus in use there is little or no pressure differential acting across the drainage outlet. Under these circumstances, there is generally no need to bias the valve to an open position. Thus, when the reservoir is empty of coalesced liquid, the drainage outlet can be closed, e.g. simply by the weight of the float valve.

The float valve may have a flotation device that floats on a surface of the collected coalesced liquid, the flotation device carrying a control member that interacts with the drainage outlet, such that movement of the control member caused by upwards movement of the flotation device opens the drainage outlet and movement of the control member caused by downwards movement of the flotation device closes the drainage outlet. For example, the control member may be a spigot that extends downwards from the flotation device to slidingly engage in a correspondingly shaped channel forming the drainage outlet a side opening in the spigot providing a path for flow of coalesced liquid out of the reservoir through the drainage channel when the flotation device lifts the spigot above a level at which the side opening is exposed to the coalesced liquid in the reservoir. Thus, the level of coalesced liquid in the reservoir can be reliably controlled. As another example, a cantilever may extend from the flotation device, the cantilever being pivotably attached to a side wall of the reservoir and having the control member extending downwardly therefrom between the side wall and the flotation device, the control member being sealable (e.g. via an O-ring) to a mouth of the drainage outlet to close it when the cantilever drops under downwards movement of the flotation device below a predetermined level; and the control member opening the mouth of the drainage outlet when the cantilever rises under upwards movement of the flotation device above the predetermined level.

The support element may be a platform, and, in use, the filter may be intended to be oriented such that the coaxial, nested, tubular filter elements are supported upright on the platform with the reservoir below, whereby the respective paths for the collection of separated coalesced liquid between pairs of successive filter elements include respective annular rings formed by the platform between pairs of successive filter elements and communication holes formed in the platform for flow of coalesced liquid from the annular rings to the reservoir. The multi-stage coalescing filter may have just two nested tubular filter elements and a single annular ring. Alternatively, however, the multi-stage coalescing filter may have three or more nested tubular filter elements and a plurality of annular rings. The platform may have plural communication holes arranged in one or more circumferential rows. Thus, the communication holes can be arranged around the respective tubular filter elements to direct the coalesced liquid from the or each annular ring. The end cap may further provide a respective pair of annular side walls for the or each annular ring, the side walls extending up opposing sides of the respective pair of successive tubular filter elements to isolate the coalesced liquid collected on the ring from the filter elements. Advantageously, this can ensure that coalesced liquid separated by the filter elements does not return to the filter elements to saturate them and thereby reduce filtration efficiency. Similarly to the multi-stage coalescing filter of the first aspect, the annular side walls may have different heights. For example, when the filter is configured for an aerosol-containing gas stream that passes radially outwards through the nested filter elements, the outer side wall of each ring can be higher than the inner side wall such that the separated coalesced liquid can flow on the respective annular ring but is primarily prevented from saturating the downstream filter element. Conversely, when the filter is configures for an aerosol-containing gas stream that passes in the opposite direction radially inwardly through the nested filters, the inner side wall of each ring can be higher than the outer side wall to achieve the same effect.

Alternatively to the platform, the support element may be an upright wall, and, in use, the filter may be intended to be oriented such that ends of the coaxial, nested, tubular filter elements are supported by a side of the upright wall so that the filter elements extend sideways with the reservoir on the opposite side of the wall, whereby the respective paths for the collection of separated coalesced liquid between pairs of successive filter elements include respective inclined troughs extending from the wall between pairs of successive filter elements to collect coalesced liquid dripping from the bottom dead centre positions of the filter elements and to channel the coalesced liquid to communication holes formed in the wall for flow of coalesced liquid from the troughs to the reservoir. Advantageously, the inclined troughs can act both as guides for the separated coalesced liquid and as shields protecting downstream filter elements from the separated coalesced liquid to reduce saturation and increase filtration efficiency. Such a filter is configured for an aerosol-containing gas stream that passes radially outwardly through the nested filter elements. The multi-stage coalescing filter of the second aspect may have just two nested tubular filter elements and a single inclined trough. Alternatively, however, the multi-stage coalescing filter may have three or more nested tubular filter elements and a plurality of inclined troughs.

The support element and the reservoir may be integrated to form the end cap. For example, the support element and the reservoir may be integrally moulded, e.g. in a two-step end cap moulding process. Advantageously, the thus-formed end cap can act as a consumable that can be easily installed on and/or replaced in a coalesced liquid separator. Alternatively, the support element and the reservoir may be separate components which are sealingly engaged to form the end cap. Advantageously, this could improve ease of access to the reservoir e.g. for maintenance purposes.

The end cap of the second aspect may be a first end cap which closes off the ends of the tubular filter elements to the aerosol-containing gas stream, and the multi-stage coalescing filter may further have a second end cap at opposite ends of the tubular filter elements to the first end cap, the second end cap forming a central port to communicate the aerosol-containing gas stream with the inside of the innermost tubular filter element. Conveniently, the second end cap may be formed as a single component which closes off all the opposite ends and forms the central port. When the filter is configured for an aerosol-containing gas stream that passes radially outwardly through the nested filter elements, the central port receives the aerosol-containing gas stream as an incoming aerosol-containing gas stream, and when the filter is configured for an aerosol-containing gas stream that passes radially inwardly through the nested filter elements, the central port receives the aerosol-containing gas stream as an outgoing aerosol-containing gas stream. Either way, the first end cap and the second end cap ensure that the aerosol-containing gas stream passes as intended through the filter elements and the central port.

The filter of the first or second aspect is typically intended to be used inside a pressure tight housing of a coalesced liquid separator. For example, such a housing may have a bowl which contains the filter and a head which seals to the bowl and provides an inlet arrangement and an outlet arrangement for the aerosol-containing gas stream. The bowl is removable from the head to allow access to and replacement of the filter. The bowl and the head are generally cast or machined metal components in order to provide adequate strength and pressure tightness. The filter is typically a consumable item. Moreover, the filter does not need to play a role in maintaining pressure tightness with the external environment. Accordingly, the end cap(s) can conveniently be formed of plastic material. For example, it may be formed by injection moulding, which allows complex end cap shapes (such as the end cap forming a reservoir of the second aspect) to be formed rapidly and cheaply.

In a third aspect, the present invention provides a coalesced liquid separator (e.g. an oil separator) including:
    the multi-stage coalescing filter according to the first or the second aspect; and
    a housing containing the filter;

wherein the housing has an inlet arrangement for receiving an aerosol-containing gas stream (e.g. airflow) and directing it to the coaxial, nested, tubular filter elements for separation of coalesced liquid therefrom, and the housing has an outlet arrangement for collecting the filtered gas stream leaving the coaxial, nested, tubular filter elements and exiting it from the separator.

The housing may have a bowl which contains the filter and a head which seals to the bowl and provides the inlet arrangement and the outlet arrangement. The housing (e.g. the bowl and/or the head) may be formed of metal, e.g. aluminium alloy, cast iron or steel, or may be formed of a polymer such as polycarbonate.

When the multi-stage coalescing filter is a filter according to the first aspect, the separator may be configured so that, in use, between an upper position at the top surface of coalesced liquid collected in the sumps and a lower position at the outlets from the chamber, there is a pressure differential in addition to any hydraulic head in the coalesced liquid between the upper and lower positions, the pressure differential being such as to drive the coalesced liquid from the sump and through the chamber (i.e. by a higher pressure at the upper position than at the lower position). Usefully, the pressure differential can thus overcome any resistance to liquid flow through the porous element, due to e.g. surface tension effects. For example, the pressure differential may at least 5 kPa, and preferably may be at least 10 kPa. The outlets may guide the received coalesced out of the filter and into a collection tank of the liquid separator. To achieve the pressure differential, the collection tank should be isolated from the gas stream arriving in the separator through the inlet arrangement.

When the coalesced liquid separator has the multi-stage coalescing filter of the second aspect and the support element and the reservoir are formed as separate components, the components may only be sealingly engaged to form the end cap on installation in the housing.

The present invention includes combination of any of the aspects and optional features described, except where such a combination is clearly impermissible or expressly avoided.

SUMMARY OF THE FIGURES

Embodiments of the invention will now be described by way of example with reference to the accompanying drawings in which.

DETAILED DESCRIPTION OF THE INVENTION

Figure 1:
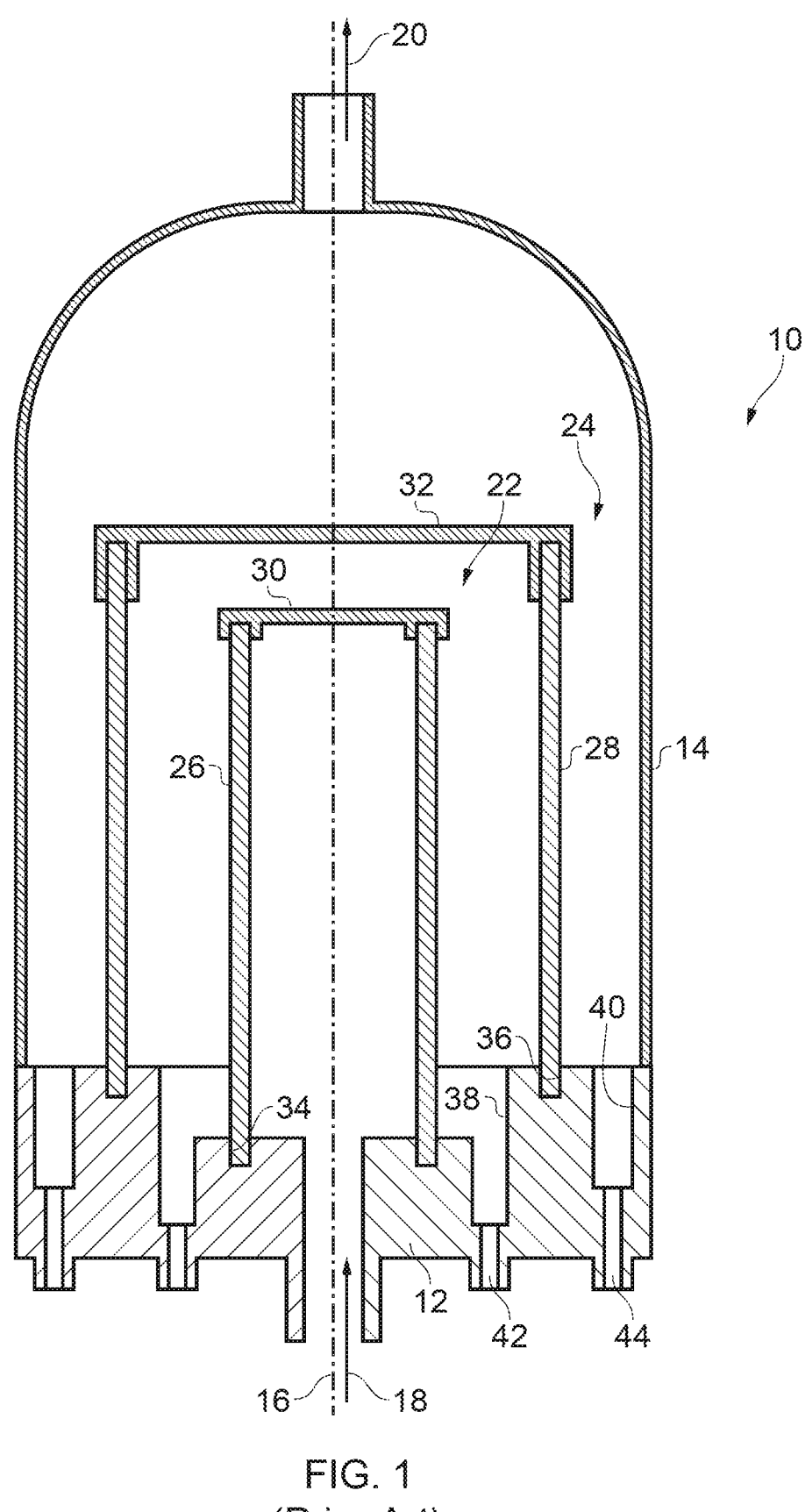
FIG. 1 shows a sectional view of a conventional multi-stage oil separator.

Aspects and embodiments of the present invention will now be discussed with reference to the accompanying figures. Further aspects and embodiments will be apparent to those skilled in the art.

The present invention provides a multi-stage coalescing filter for separating coalesced liquid. In the examples discussed below, the coalesced liquid is oil and the aerosol-containing gas stream is an airflow, e.g. from a compressor or a pump such as a cryo pump or a vacuum pump. The multi-stage coalescing filter is installable in a housing of a coalesced liquid separator (e.g. an oil separator). When an airflow enters the separator through an inlet arrangement, it is directed to pass through the multi-stage coalescing filter, and then exits the separator through an outlet arrangement. For example, the housing may have a bowl which contains the filter and a head which seals to the bowl and provides the inlet arrangement and the outlet arrangement. The filter separates oil from the airflow, the separated oil accumulating in a collection tank of the housing. From there, the separated oil can be scavenged, recycled or disposed of as appropriate.

A first type of multi-stage coalescing filter is described with reference to FIGS. 2A, 2B, 3A-3C, and 4 to 9. Corresponding features in these and subsequent drawings are indicated by the same reference numbers FIGS. 2A and 2B, and 4 to 9 show respective cross-sectional views of bottom portions of variants of a multi-stage coalescing filter 101. All variants are axisymmetric. Further, in all variants, the multi-stage coalescing filter has a (first) bottom end cap 102 supporting coaxial, nested, tubular filter elements 105a, 105b, 105c in an upright configuration. A further (second) top end cap (not shown) at the opposite ends of the filter elements 105a, 105b, 105c closes off said opposite ends. The top end cap may be formed as a single component which closes off all the opposite ends, or as several sub-components which close off respective opposite ends.

In the examples of FIGS. 2A, 2B, 4 and 6 there are two filter elements: an inner filter element 105a and an outer filter element 105b, while in the examples of FIGS. 5 and 7 to 9, there are three filter elements 105a, 105b, 105c.

Turning first to FIGS. 2A, 2B, 4 and 6, the filter elements 105a, 105b are spaced from each other such that the bottom end cap 102 between them forms an annular sump 106. The bottom end cap has a central port 103 for receiving the airflow from the inlet arrangement of the separator and communicating the airflow with the inside of the inner filter element 105a. A corresponding port is not formed in the top end cap. In use, the airflow enters through the central port and passes radially outwardly through the nested filter elements, whereby the filter elements separate oil from the airflow. Under the action of gravity, separated oil from the airflow is collected in the sump 106.

The direction of the airflow is indicated by the grey arrows, the reducing oil burden of the airflow as it passes through the filter elements 105a, 105b being indicated by the lighter shade of the arrows.

The bottom end cap 102 is formed of a bottom portion 102a and a top portion 102b. The top portion is removably couplable to the bottom portion such that the two portions form a chamber within the bottom end cap. In particular, the bottom portion defines a floor of the chamber and the top portion defines a ceiling of the chamber. The removably couplable top and bottom portions enable the location of a porous element 104 inside the chamber. FIGS. 3A to 3C show respective plan views of the bottom portion of the bottom end cap of FIG. 2B, the porous element, and the top portion of the bottom end cap of FIG. 2B. The plan views are supplemented by respective schematic cross-sectional views matching those shown in FIG. 2B.

The chamber formed by the bottom 102a and top 102b portions of the bottom end cap 102 has inlets 107 in fluid communication with the sump 106 for receiving the oil from the sump, the inlets being defined by the top portion. The chamber further has outlets 108 for guiding the received oil out of the filter, the outlets being defined by the bottom portion. Both the inlets and the outlets are arranged in respective circumferential rows (shown respectively in FIGS. 3C and 3A).

Figure 2A:
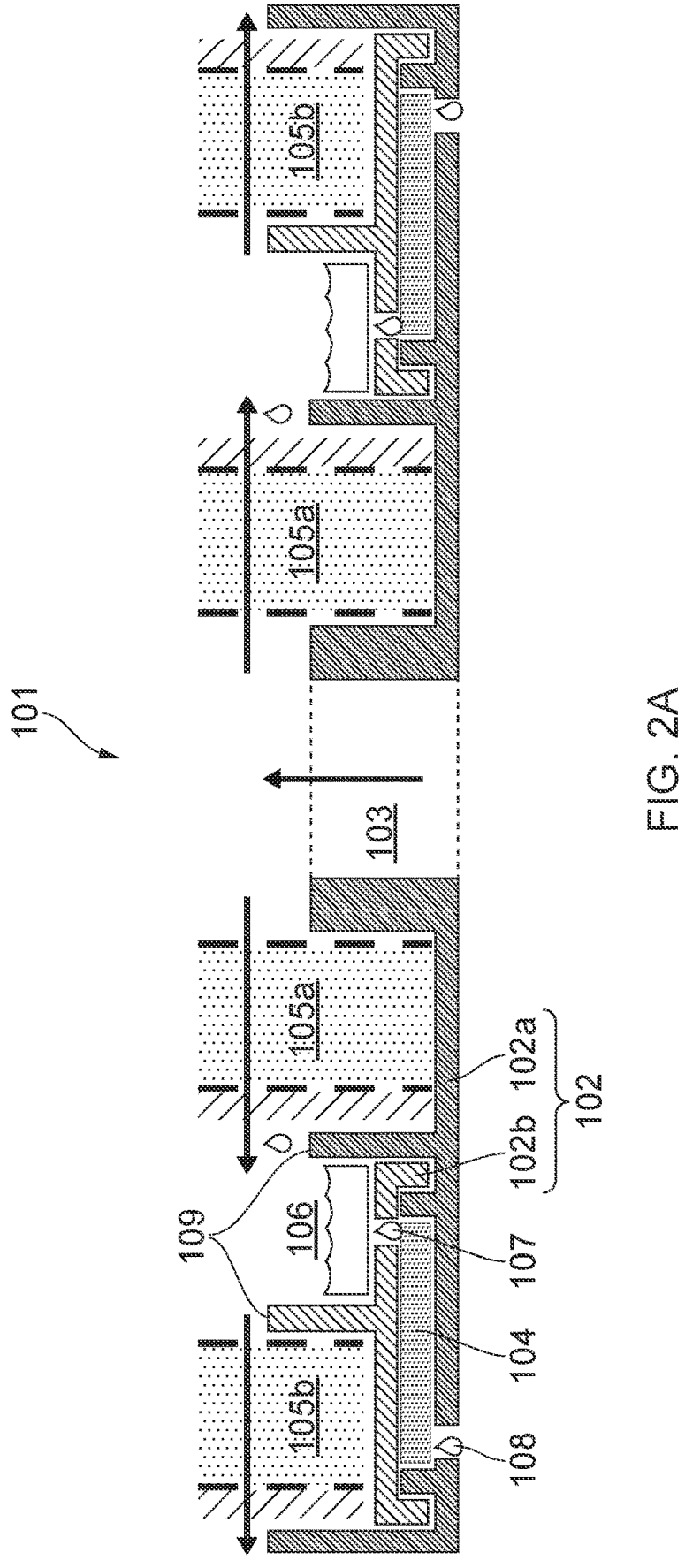
FIGS. 2A and 2B show respective cross-sectional views of bottom portions of two variants of a multi-stage coalescing filter.
Figure 2B:
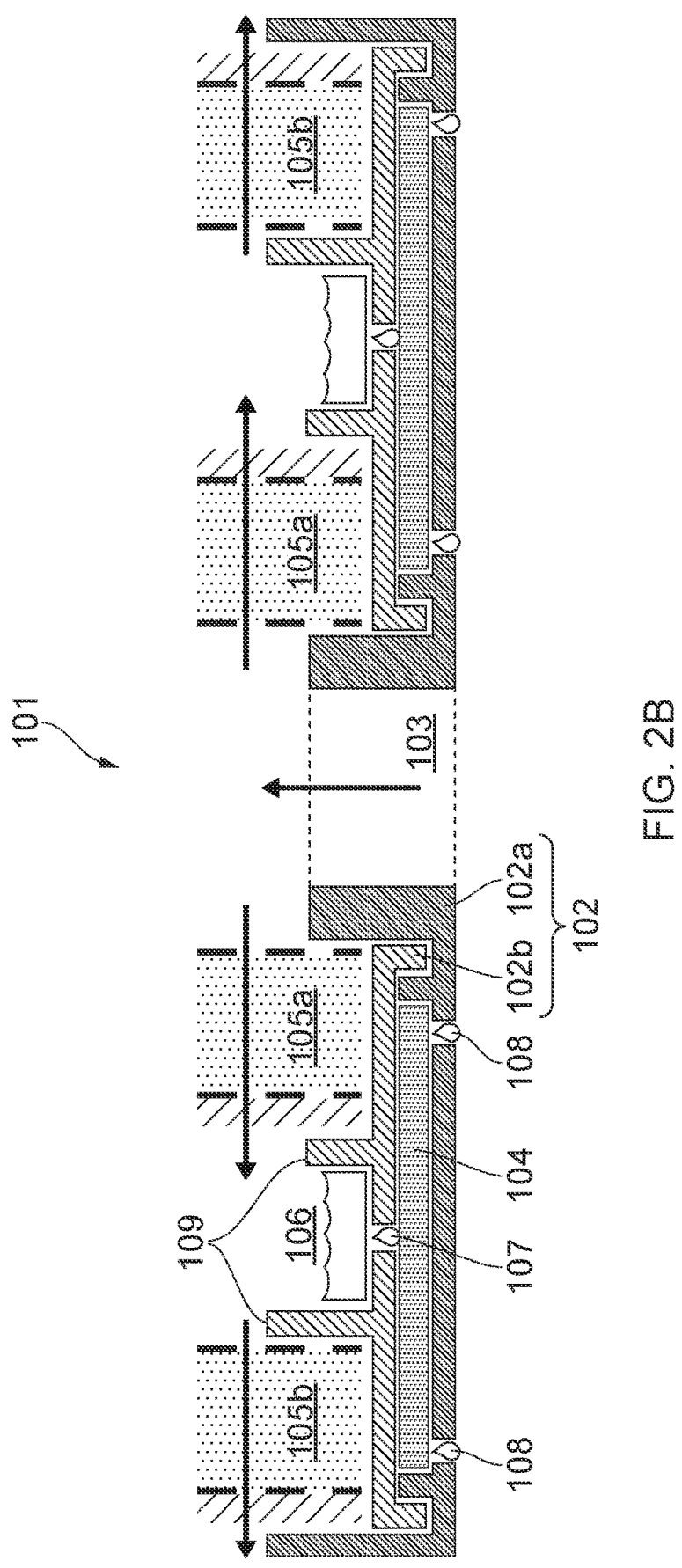
Figures 3A, 3B, 3C:
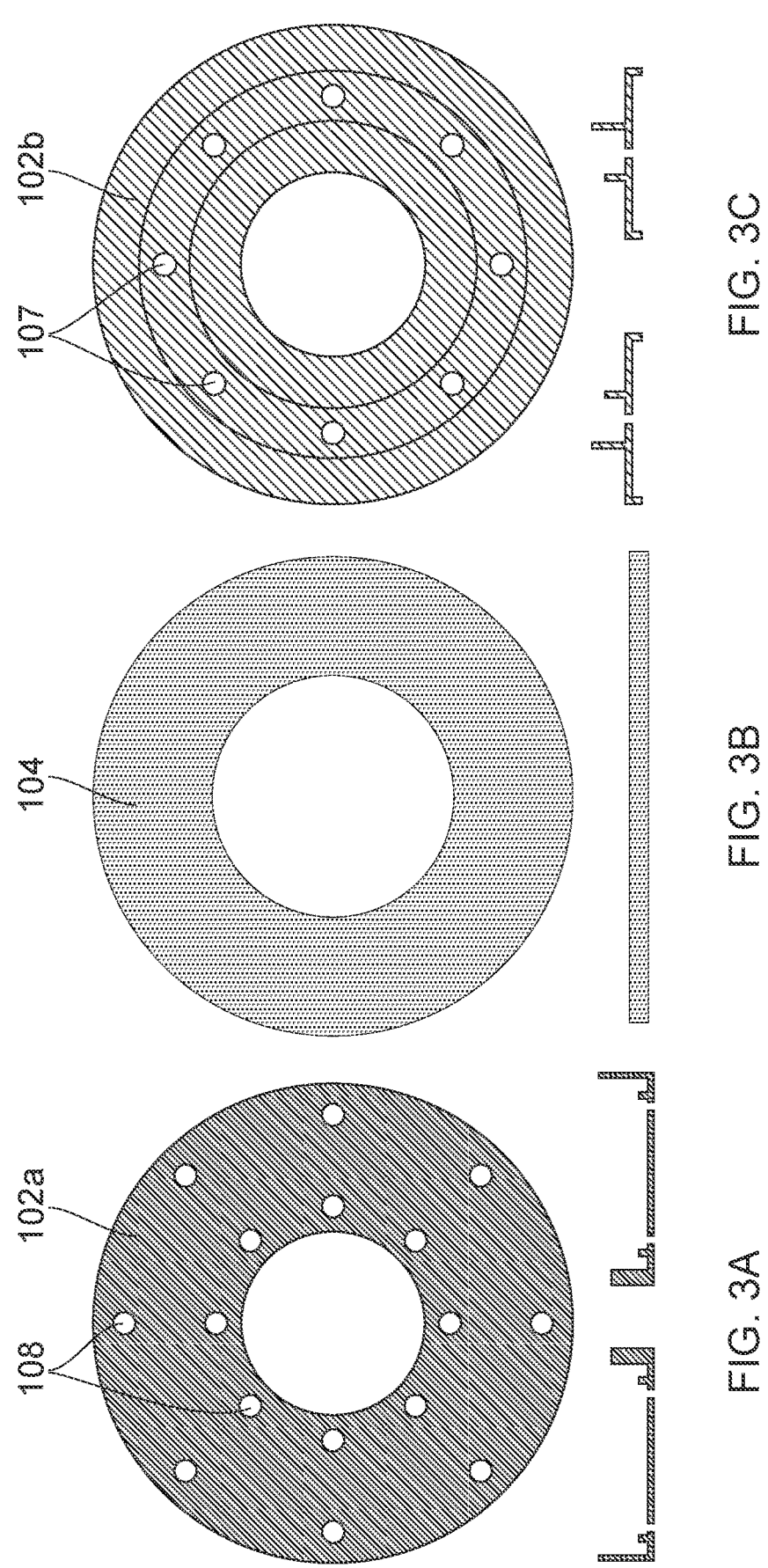
FIGS. 3A-3C show respective plan views of A the bottom portion of the end cap, B the porous element, and C the top portion of the end cap of FIG. 2B.
Figure 4:
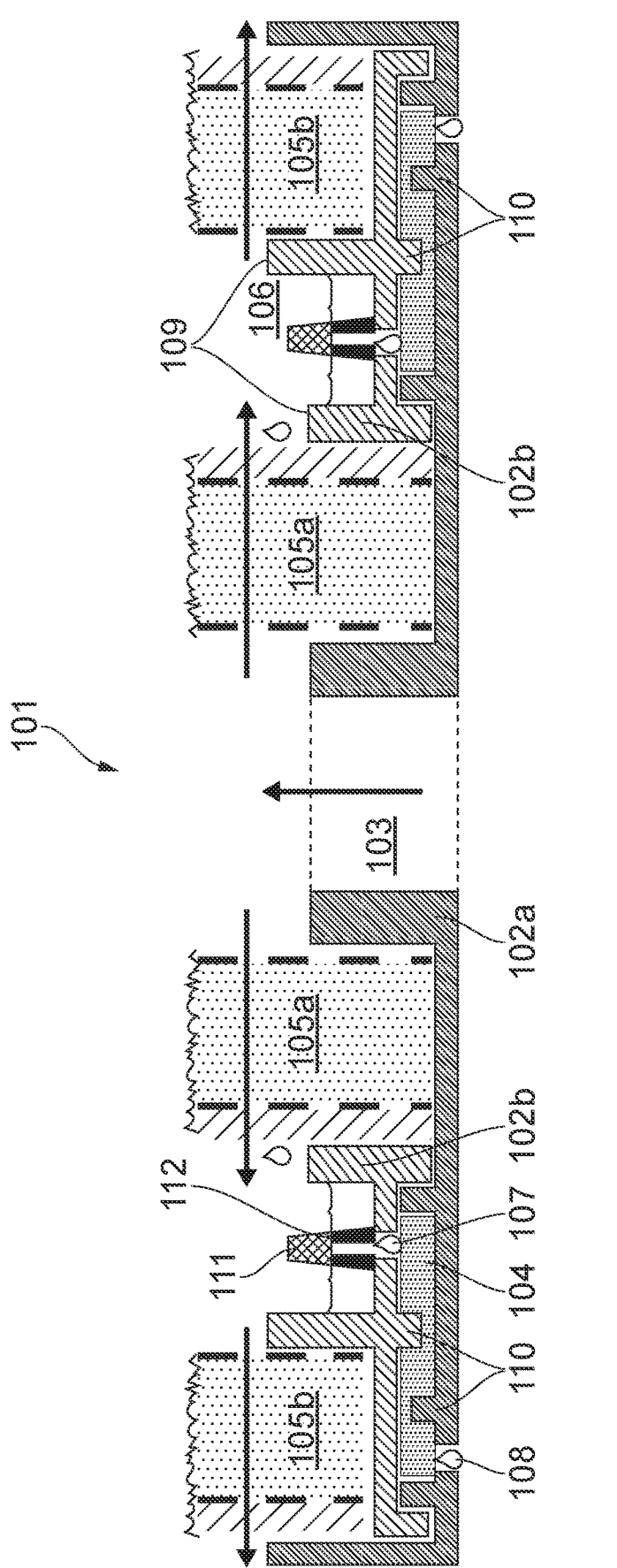
FIGS. 4 and 5 are variants of the multi-stage coalescing filter of FIG. 2A.
Figure 6:
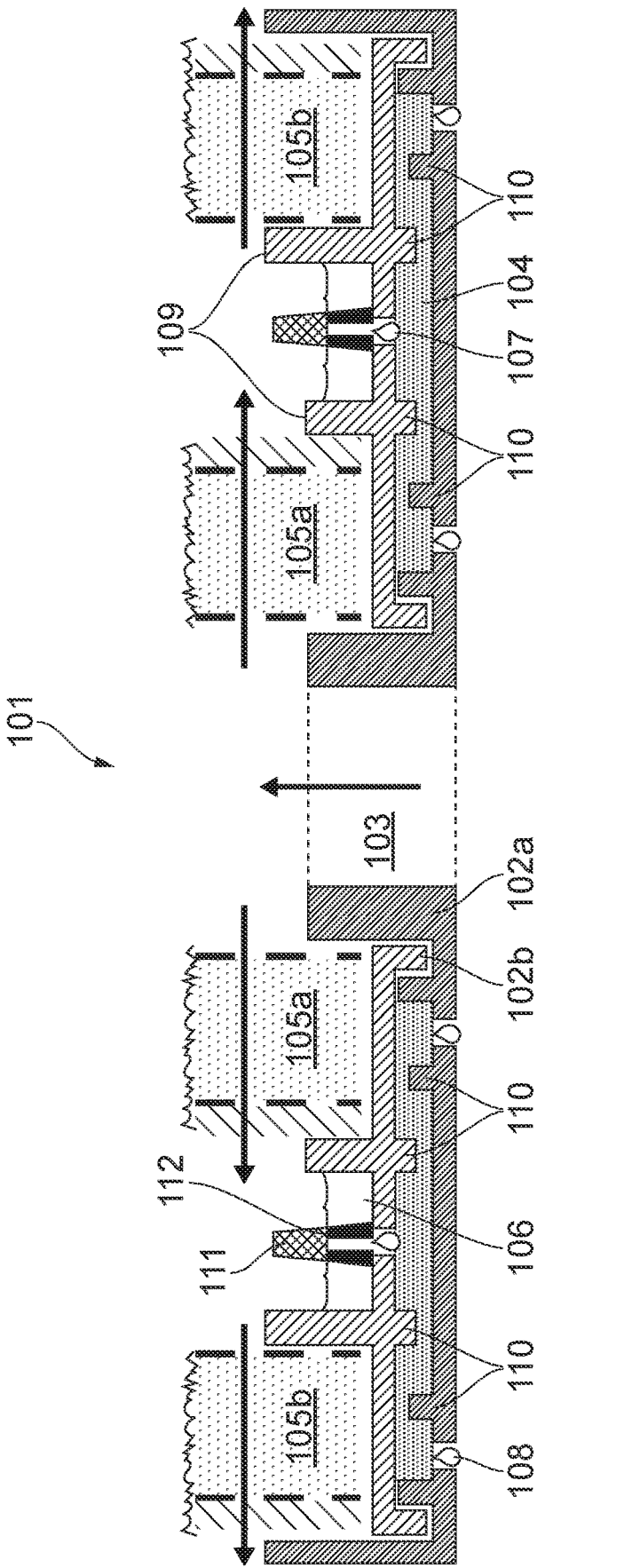
FIGS. 6 and 7 are variants of the multi-stage coalescing filter of FIG. 2B.

In FIGS. 2A and 4, the bottom portion 102a has a single row of circumferential inlets 107 and a single row of circumferential outlets 108, while in FIGS. 2B and 6, the bottom portion 102a has a single row of circumferential inlets and two rows of circumferential outlets. The oil received into the chamber from the sump 106 comes into contact with the porous element 104, thereby causing the porous element to saturate. This allows the received oil to flow through the porous element to the outlets via capillary action, while simultaneously preventing the airflow from passing through the chamber and thereby bypassing the outer filter element 105b. From the outlets, the separated oil can drop into the collection tank of the housing. The inlets, chamber containing the porous element and the outlets thus form an oil-only escape route from the filter.

In use, between an upper position at the top surface of coalesced liquid collected in the sump 106 and a lower position at the outlets 107 from the chamber, there is a pressure differential in addition to any hydraulic head in the coalesced oil between the upper and lower positions. This is because the pressure of the airflow passing through the nested filter elements 105a, 105b is higher than the pressure of air in the collection tank. For example, the pressure may be at least 5 kPa higher, and preferably may be at least 10 kPa higher. This pressure differential overcomes any resistance to oil flow through the porous element 104 and drives the coalesced oil from the sump and through the chamber. To achieve the pressure differential, the collection tank should be isolated from the airflow arriving in the separator through the inlet arrangement. As indicated above, the saturation of the porous element 104 isolates the collection tank from the airflow passing through the filter elements.

The porous element can be formed of any material or any combination of materials which is saturable and can reliably allow the received oil to flow through it via capillary action to the outlet while simultaneously preventing the airflow from bypassing the nested filter elements via the chamber. The porous element can be generally formed of different materials to control its porosity and saturability as required. For example, the porous element may be formed of any one or any combination of: glass fibre medium, synthetic fibre matrix, non-woven material, foam, and sintered material such as sintered plastic. Evidently the pores of the porous element should be interconnected to enable the oil flow through the element. If using glass fibre media to form the filter elements and the porous element, selection of a suitable grade for the porous element can be informed by the choice of glass fibre media for the filter elements. A foam porous element can advantageously be compressed to more completely fill the chamber, thereby further reducing a risk of aerosol bypass. Sintered plastic, such as a commercially available product e.g. available from Porvair™, generally have well-defined pore sizes which allow reliable control of oil flow rates through the porous element at a range of differential pressures.

The bottom end cap 102 also provides a pair of annular side walls 109 for the sump 106, the side walls extending up opposing sides of the inner 105a and outer 105b tubular filter elements to better isolate the oil collected in the sump from the filter elements. The side walls further have different heights. In this example, the outer side wall is higher than the inner side wall. Thus, as the airflow passes radially outwardly through the nested filter elements, the separated oil can accumulate in the sump but is primarily prevented from saturating the outer filter element (which removes finer oil droplets from the airflow than the inner filter element). If the filter was configured for an airflow that passes in the opposite direction, i.e. radially inwardly through the nested filters, then, the inner side wall of the sump would be higher than the outer side wall to achieve the same effect.

In the example of FIG. 2A, the inner wall 109 is formed by the bottom portion 102a of the bottom end cap 102, while the outer wall 109 is formed by the top portion 102b. This enables the relative height difference between the two annular side walls to be changed simply by changing/replacing the top portion of the bottom end cap. In contrast, in the example of FIGS. 2B, 4, and 6, both annular side walls are formed by the top portion of the end cap, thereby improving the structural simplicity of the bottom end cap.

The variants shown in FIGS. 4 and 6 chiefly differ from those shown in FIGS. 2A and 2B by including pre-filter elements 111 and orifice-containing parts 112 which are fitted to the sump sides of the chamber inlets 107, as well as including radially spaced annular ribs 110 in the chamber 104. In particular, each chamber inlet 107 is in fluid communication with its respective sump 106 via a pre-filter element 111 mounted on a respective orifice-containing part 112, the orifice being detachably attached to the inlet. Thus, the separated oil from the first filter element can be at least partially purified by passing through the pre-filter element before being guided out of the multi-stage coalescing filter, e.g. for return to a compressor/vacuum pump. In these examples, the orifice-containing parts 112 extend upwardly from the respective chamber inlets to a height that is less than that of the shorter annular side wall of the respective sump to allow the collected oil to drain from the sump into the chamber without contacting and saturating the respective pair of filter elements.

Turning to the radially spaced annular ribs 110 shown in FIGS. 4 and 6, when the porous element 104, 104' is formed of a compressible material, e.g. a foam, the ribs can advantageously compress the porous element at selected locations to create pinch points in the porous element at which the amount of oil required to saturate the porous element is reduced. Thus, the pinch points quickly saturate when the oil first comes into contact with the porous and act as gas stoppers to reduce the risk of aerosol bypass during these initial stages of oil drainage through the chamber.

Figure 5:
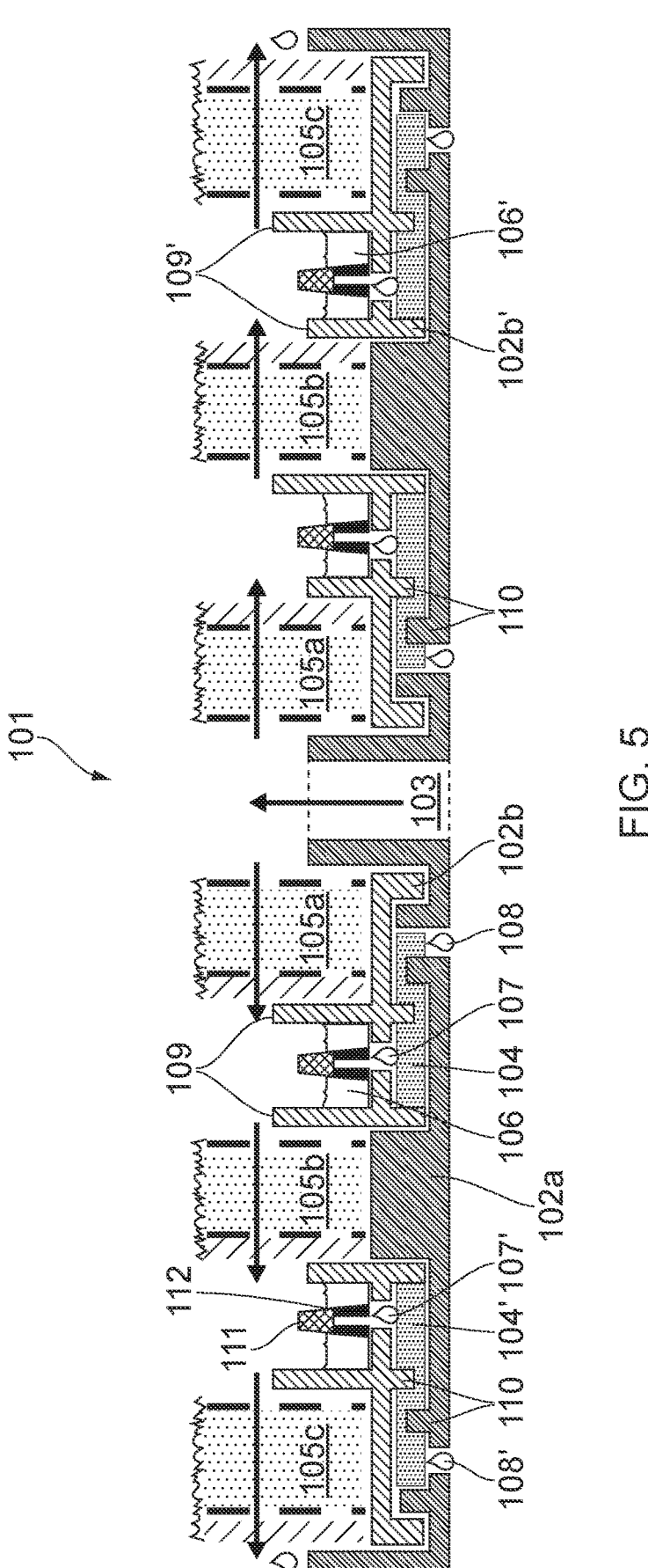
Figure 7:
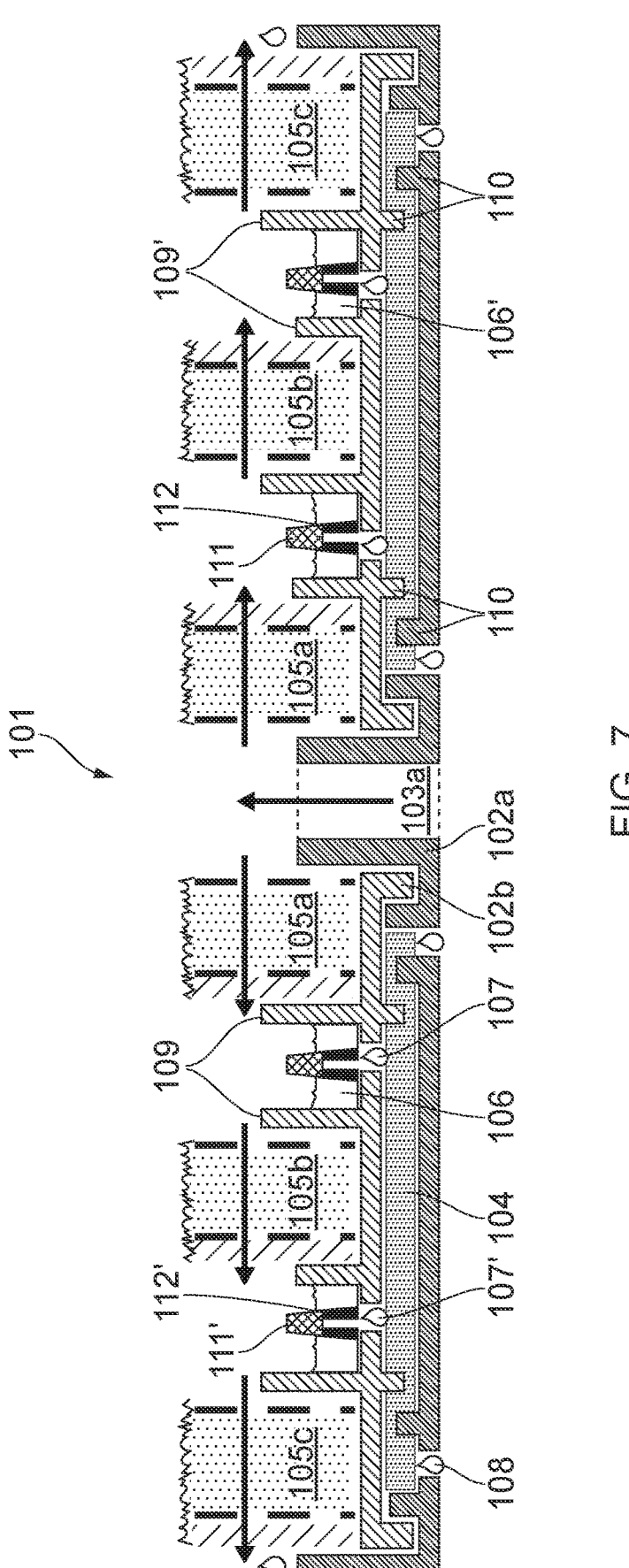
Figure 8:
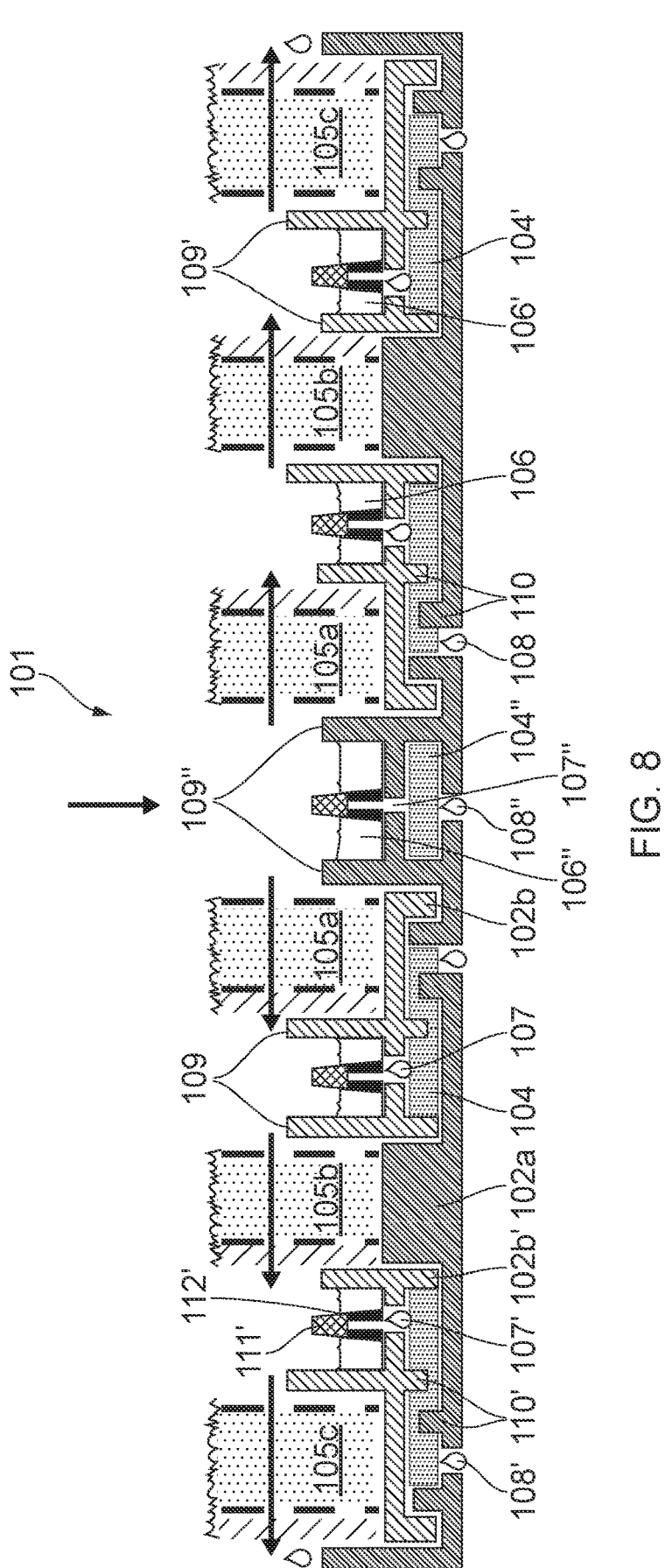
FIG. 8 is a variant of the multi-stage coalescing filter of FIG. 5.
Figure 9:
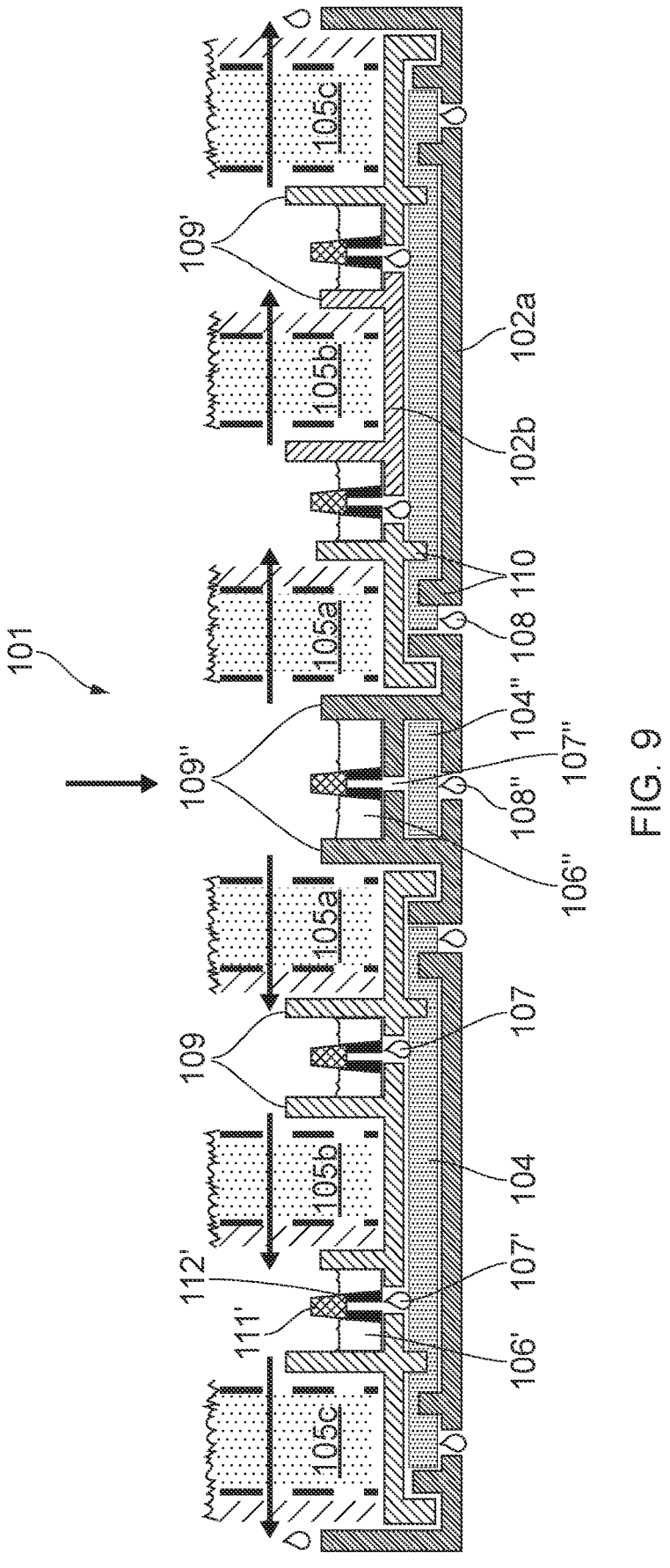
FIG. 9 is a variant of the multi-stage coalescing filter of FIG. 7.

Further modifications of the multi-stage coalescing filter 101 are possible. For example, the multi-stage coalescing filter can have three nested tubular filter elements 105, 105b, 105c and two annular sumps 106, 106', as shown in FIGS. 5 and 7 to 9. In this case, one option for the chamber is to be a single undivided space which receives oil from all the sumps. Examples of this are shown in FIGS. 7 and 9 where the single chamber has one or more inlets from each sump 106, 106'. Another option is for the chamber to be divided into separate (annular) sub-chambers which receive oil from respective sumps 106, 106'. This option is shown in FIGS. 5 and 8, where each sub-chamber has its own one or more inlets and outlets, and the porous element 104 is formed as separate sub-elements 104, 104' respectively housed in the sub-chambers.

In another modification (shown in FIGS. 8 and 9), the central port is formed in the top end cap rather than the bottom end cap. In this case, separated oil accumulates in a central sump 106" formed at the base of the central bore of the innermost filter element 105a, the bottom end cap having a further oil-only escape route from the base of the central bore (i.e. an inlet 107", a further, central chamber containing a porous element 104", and an outlet 108") configured to allow oil to drop into the collection tank without causing the airflow to bypass the filter elements. In the examples of FIGS. 8 and 9, the central sump 106" has an annular side wall 109" extending up the inner side of the innermost tubular filter element 105a. The central chamber is formed entirely by the bottom portion 102a of the bottom end cap.

Additionally, all variants of the multi-stage coalescing filter shown in FIGS. 5, and 7 to 9 include one or more radially spaced annular ribs 110 analogous to these shown in and discussed in relation to FIGS. 4 and 6.

Next, a second type of multi-stage coalescing filter 201 is described with reference to FIG. 10. The multi-stage coalescing filter includes two coaxial, nested, tubular filter elements 205a, 205b in an upright configuration, a bottom end cap 202 and second, top end cap (not shown) closing off opposite ends of the filter elements. The top end cap forms a central port (not shown) to communicate the airflow with the inside of the inner tubular filter element 205a. When the filter 201 is configured for an airflow that passes radially outwardly through the nested filter elements, the central port receives the airflow as an incoming airflow, and when the filter is configured for an airflow that passes radially inwardly through the nested filter elements, the central port receives the airflow as an outgoing airflow. Either way, the end caps ensure that the airflow passes as intended through the filter elements and the central port. The top end cap is typically formed as a single component which, central port aside, closes off all the opposite ends.

In addition to closing off ends of the filter elements 205a, 205b, the bottom end cap 202 provides a platform 211 that retains the ends. The filter elements are spaced from each other such that a path for a flow of oil separated by the filter elements from the airflow is formed by an annular ring 206 provided by the platform. While the multi-stage coalescing filter 201 in this example includes just two nested tubular filter elements 205a, 205b, in another option the filter may have three or more nested tubular filter elements and a plurality of annular rings 206.

Similarly to the side walls of the sumps of the multi-stage coalescing filter of FIGS. 2A and 2B, the platform provides a pair of annular side walls 209 for the annular ring 206. The side walls extend up opposing sides of the tubular filter elements to better isolate the oil collected on the ring from the filter elements. In this example, the side walls have different heights. Thus, as the airflow passes radially outwardly through the filter elements, the separated oil can accumulate in the annular ring but is primarily prevented from contaminating the outer filter element 205*b* (which removes finer oil droplets from the airflow than the inner filter element). The platform further includes circumferentially arranged communication holes 207 formed around the filter elements for flow of oil from the annular ring to a reservoir 212 formed by the bottom end cap and located below the platform. The reservoir in this example functions as an intermediate drain system for draining separated oil out of an oil separator having the multi-stage coalesced filter 201. In this example, the platform 211 and the reservoir 212 are formed as separate components which are then sealingly engaged to form the bottom end cap 202 via a push-fit, threaded, glued or otherwise bonded connection. This enables assembly of parts inside the reservoir (discussed below), and, if the two components can be disengaged, provides access to the reservoir, e.g. for maintenance purposes, such as de-sludging.

The reservoir includes a float valve 204 configured to open a drainage outlet 208 formed in the bottom of the reservoir to drain oil therefrom when a level of oil in the reservoir reaches or exceeds a predetermined level. The float valve is further configured to close the drainage outlet when the level of oil in the reservoir falls below the predetermined level. Thus, the valve seals the reservoir and reduces the risk of oil aerosol bypass while allowing oil from the reservoir to exit the multi-stage coalescing filter via the drainage outlet, e.g. to pass to a collection tank of the separator housing.

In more detail, the float valve 204 has a flotation device 203, such as a bladder, that floats on a surface of the collected oil, and a control member in the form of a spigot 213 that extends downwards from the flotation device to slidingly engage in a correspondingly shaped channel forming the drainage outlet 208. The spigot has a side opening 210 providing a path for flow of oil out of the reservoir 212 through the drainage channel when the flotation device lifts the spigot above a level, corresponding to a height of the channel, at which the side opening is exposed to the oil in the reservoir. A sludge zone is formed in the reservoir below the height of the channel for the collection of sludge (indicated by darker shading in FIG. 4) from the separated oil. Keeping the sludge below the level of the height of the channel helps to reduce the risk of blockage of the drainage outlet 208.

The float valve 204 is configured such that, when there is no pressure differential across the drainage outlet 208 and the reservoir 212 is empty of oil, the drainage outlet 208 is closed. The bottom end cap 202 (with its reservoir 212) and the filter elements 205*a*, 205*b* of the multi-stage coalescing filter 201 are configured to be deployed inside a separator housing, and thus even in use there is little or no pressure differential acting across the drainage outlet. Under these circumstances, there is generally no need to bias the valve to an open position. Thus, when the reservoir is empty of oil, the drainage outlet is closed simply by the weight of the float valve.

Figure 10:
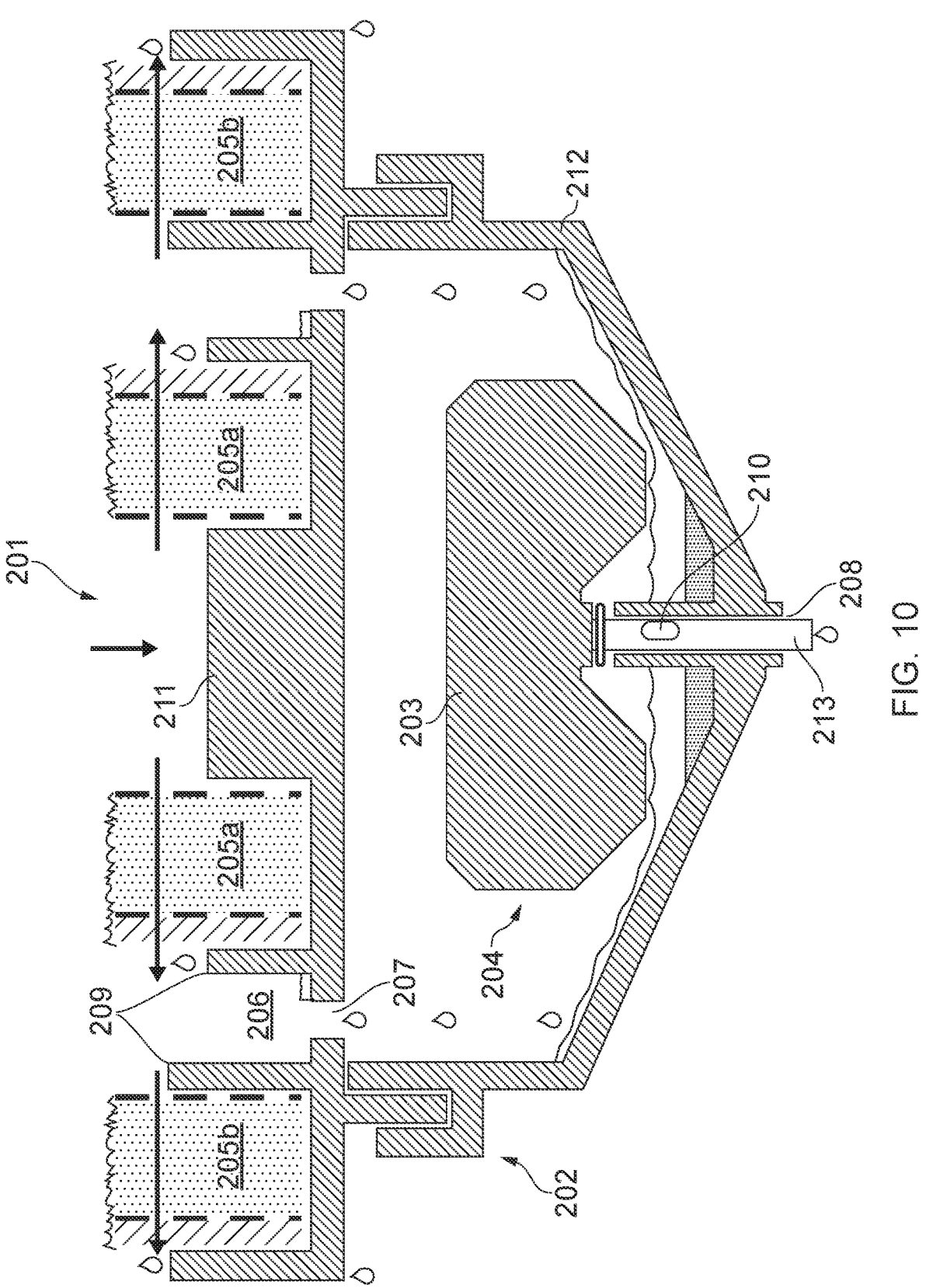
FIG. 10 shows a cross-sectional view of a portion of a different type of multi-stage coalescing filter.
Figure 11A:
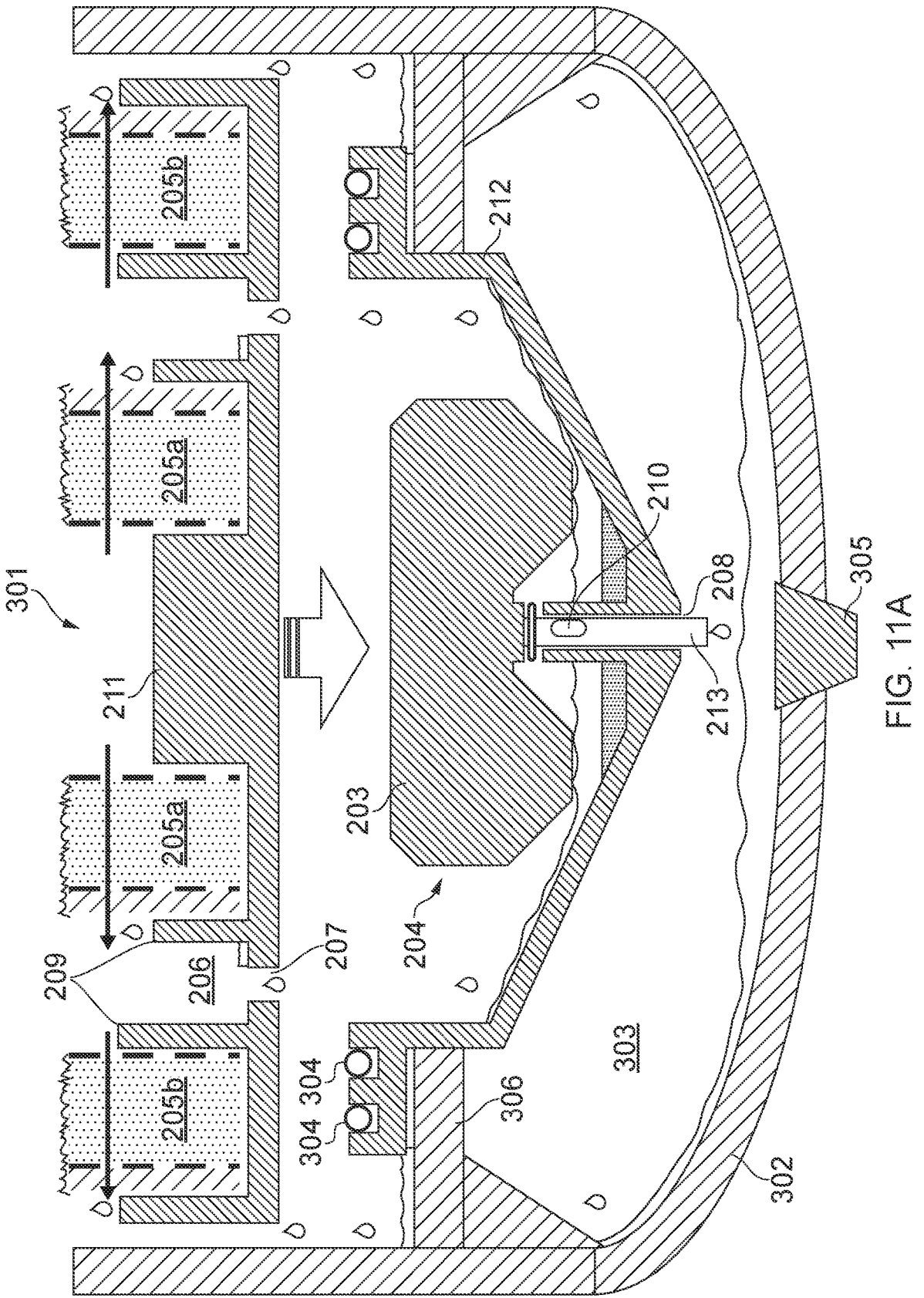
FIG. 11A shows a sectional view of a bottom portion of a coalesced liquid separator and a multi-stage coalescing filter in the process of being installed in the separator.
Figure 11B:
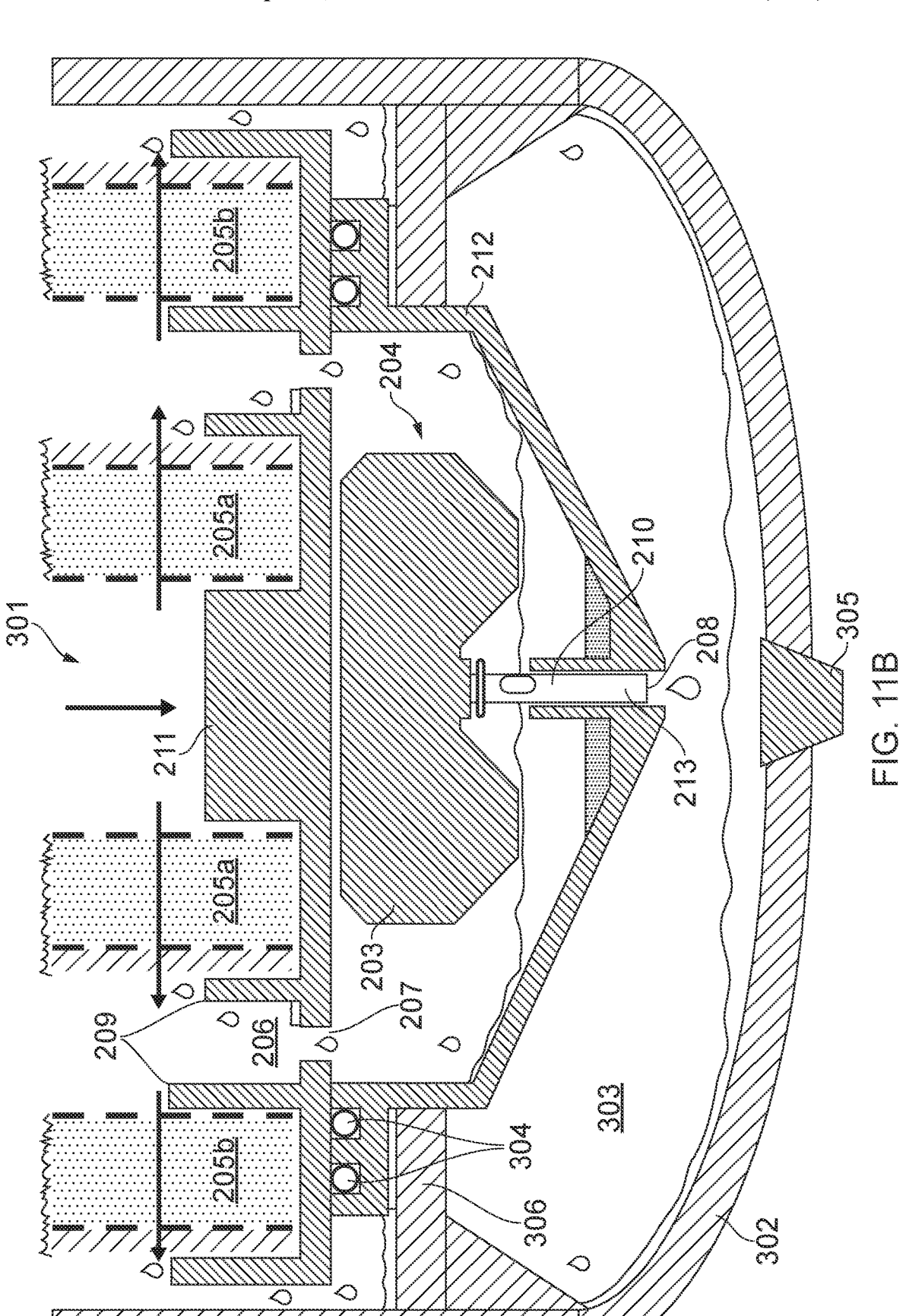
FIG. 11B shows the corresponding sectional view after installation is complete.

Next, a coalesced liquid separator 301 having a multi-stage coalescing filter 201 similar to that shown in FIG. 10 is described with reference to FIGS. 11A and 11B. In this example the coalesced liquid separator is an oil separator. FIG. 11A shows a sectional view of a bottom portion of the oil separator and the multi-stage coalescing filter in the process of being installed in the separator, and FIG. 11B shows the corresponding sectional view after installation is complete. The oil separator includes a housing 302 having a bowl which contains the filter and a head (not shown) which seals to the bowl and provides an inlet arrangement and an outlet arrangement for the airflow. The bowl is removable from the head to allow access to and replacement of the filter. The bowl and the head are generally cast or machined metal components in order to provide adequate strength and pressure tightness. The filter is used inside the pressure tight housing of the separator, which avoids any need for the filter to play a role in maintaining pressure tightness with the external environment. Accordingly, the filter end cap(s) (including the reservoir of the bottom end cap 202) can conveniently be formed of plastic material. For example, they may be formed by injection moulding, which allows complex end cap shapes to be formed rapidly and cheaply.

The platform 211 and the reservoir 212 are formed as separate components which differ from those of the filter 201 of FIG. 4 in that they only sealingly engage to form the bottom end cap 202 once they are in situ in the separator 301. Thus, to install the multi-stage coalescing filter 201 in the separator 301, first the reservoir is rested on a shoulder 306 formed on the inside of the housing 302 (as shown in FIG. 11A) and then, the platform retaining the filter elements 205*a*, 205*b* is lowered into the housing to rest onto and sealingly engage to the reservoir. Pairs of O-rings 304 are located in matching grooves formed in an upper surface of a flange which extends around the top of the reservoir. These O-rings press against a lower surface of the platform when the platform is installed to seal the platform to the reservoir. This sealing arrangement facilitates subsequent access to the reservoir.

Below the reservoir 212, the housing forms an oil collection tank 303 which collects separated oil from the reservoir via the drainage outlet 208, and a housing outlet 305 through which oil can eventually be drained from the oil collection tank. When the multi-stage coalescing filter is installed in the separator as shown in FIG. 11B, the pressure inside the housing (i.e. inside the oil collection tank) is effectively the same as the pressure inside the reservoir. Thus, as discussed above, the float valve 204 does not require biasing to an open position and it closes the drainage channel 208 under its own weight when the reservoir is empty of oil.

Finally, three further variants of the multi-stage coalescing filter 201 of FIG. 10 are discussed with reference to FIGS. 12, 13, 14A, and 14B.

Figure 12:
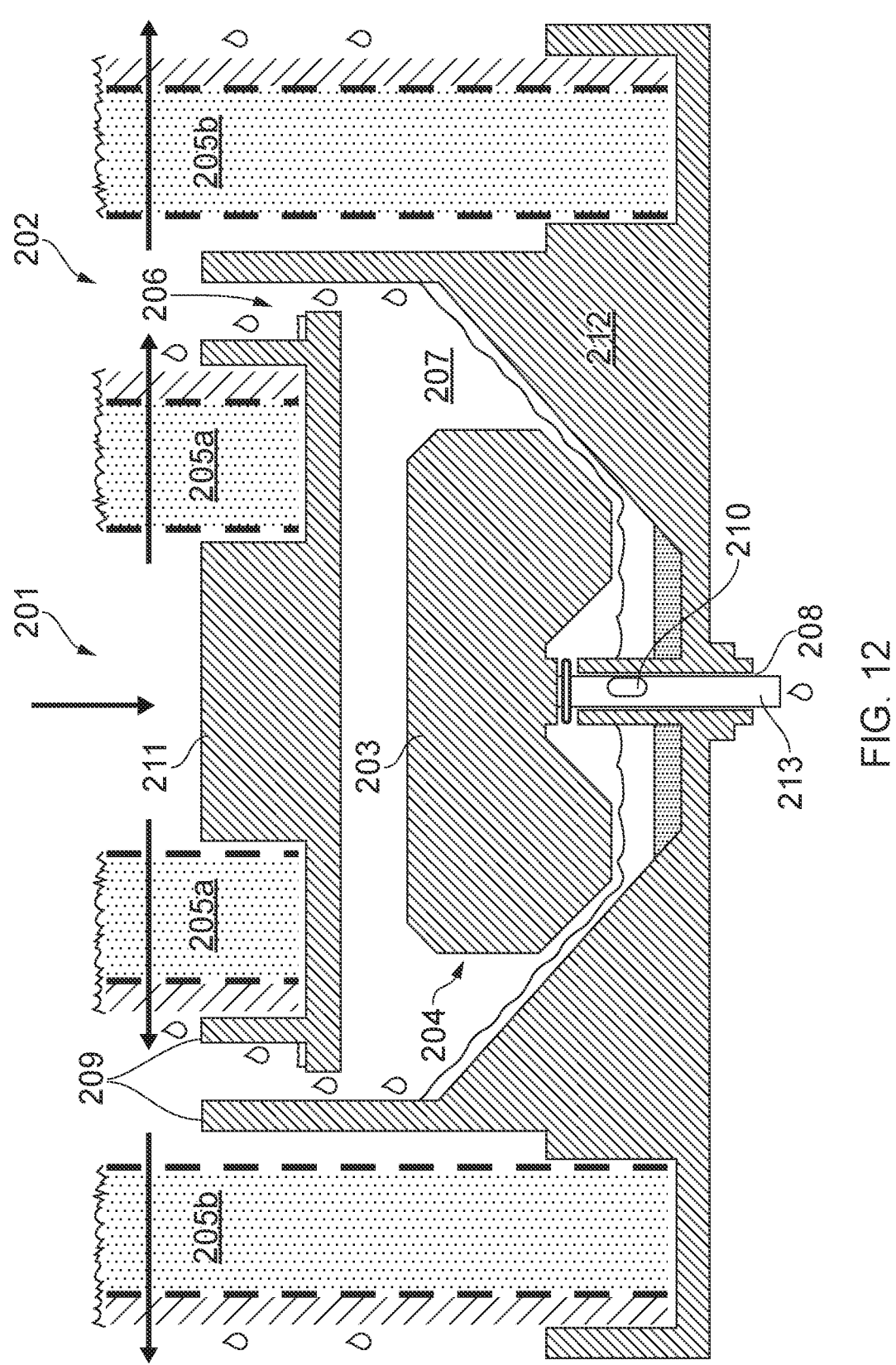
FIGS. 12 and 13 show respective cross-sectional views of portions of two variants of the multi-stage coalescing filter of FIG. 10.

The variant of FIG. 12 only differs from the example shown in FIG. 10 in that the platform 211 and the reservoir 212 are integrated to form the bottom end cap 202, and the side walls 209 of the annular ring 206 have equal heights. The platform and the reservoir can be integrated, e.g. by gluing them together or in a two-step moulding process. This form of multi-stage coalescing filter is suitable for use as a consumable that is replaced as a complete unit.

Figure 13:
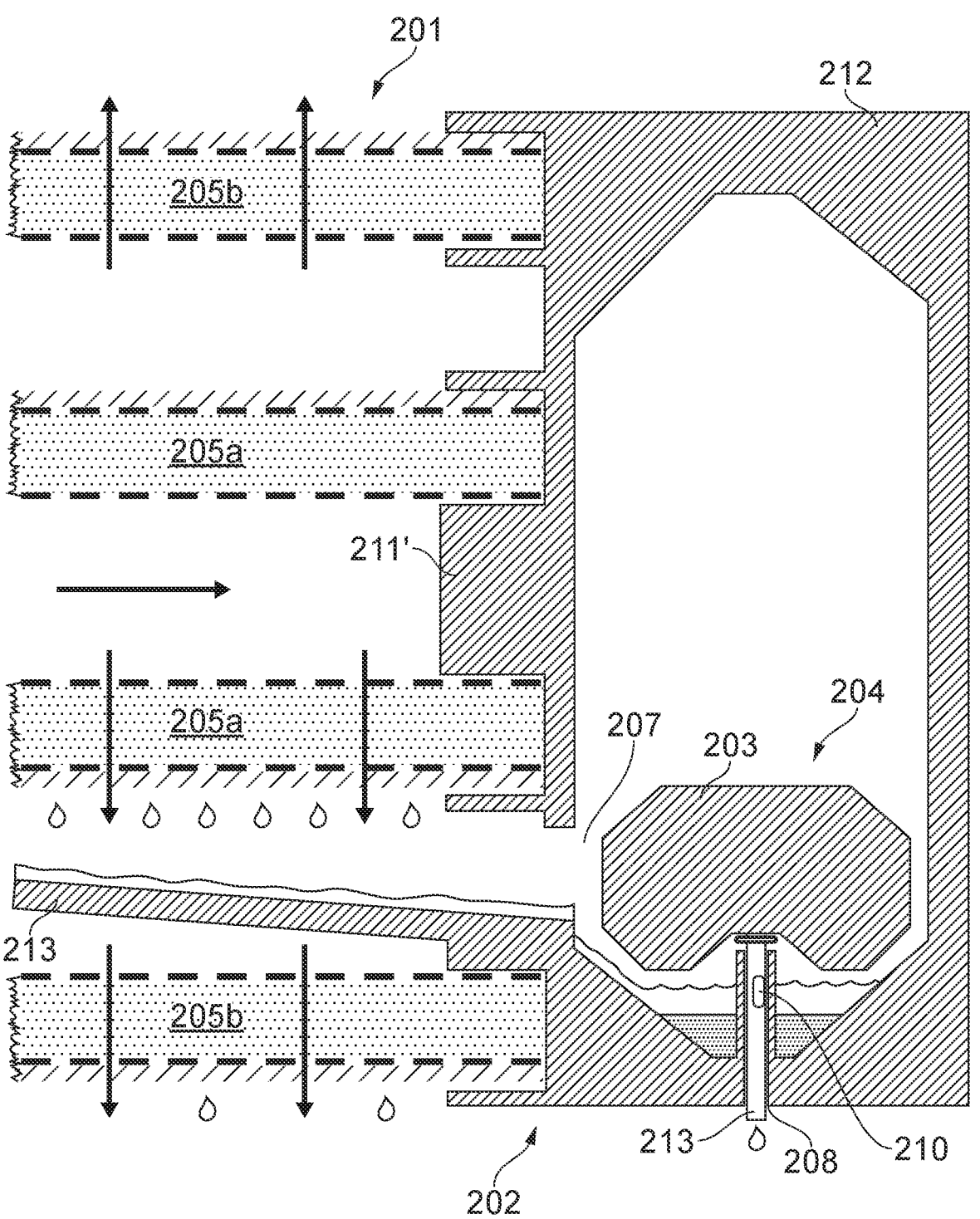

Turning to the multi-stage coalescing filter 201 of FIG. 13, instead of a platform 211, this has an upright wall 211', and in use, the filter is intended to be oriented such that ends of the filter elements 205*a*, 205*b* are supported by a side of the upright wall so that the filter elements extend sideways with the reservoir 212 on the opposite side of the wall. Similarly to the bottom end cap of the variant of FIG. 12, the upright wall and the reservoir can be integrated to form a first end cap 202. The filter is further configured for an airflow that passes radially outwards through the filter elements. A path for a flow of oil separated by the inner filter element 205*a* from the airflow is formed by an inclined trough 213 extending from the upright wall between the filter elements for the collection of separated oil. In use, the trough collects oil dripping from the bottom dead centre position of the inner filter element and channels it to a communication hole 207 formed in the wall for flow of oil from the trough to the reservoir. Thus, the trough acts both as a guide for the separated oil and as a shield protecting the outer filter element 205b from the separated oil to reduce saturation and increase filtration efficiency. While the multi-stage coalescing filter of FIG. 13 includes just two nested tubular filter elements 205a, 205b, in another option, it may have three or more nested tubular filter elements and a respective inclined trough and communication hole to the reservoir for each adjacent pair of filter elements.

Figure 14A:
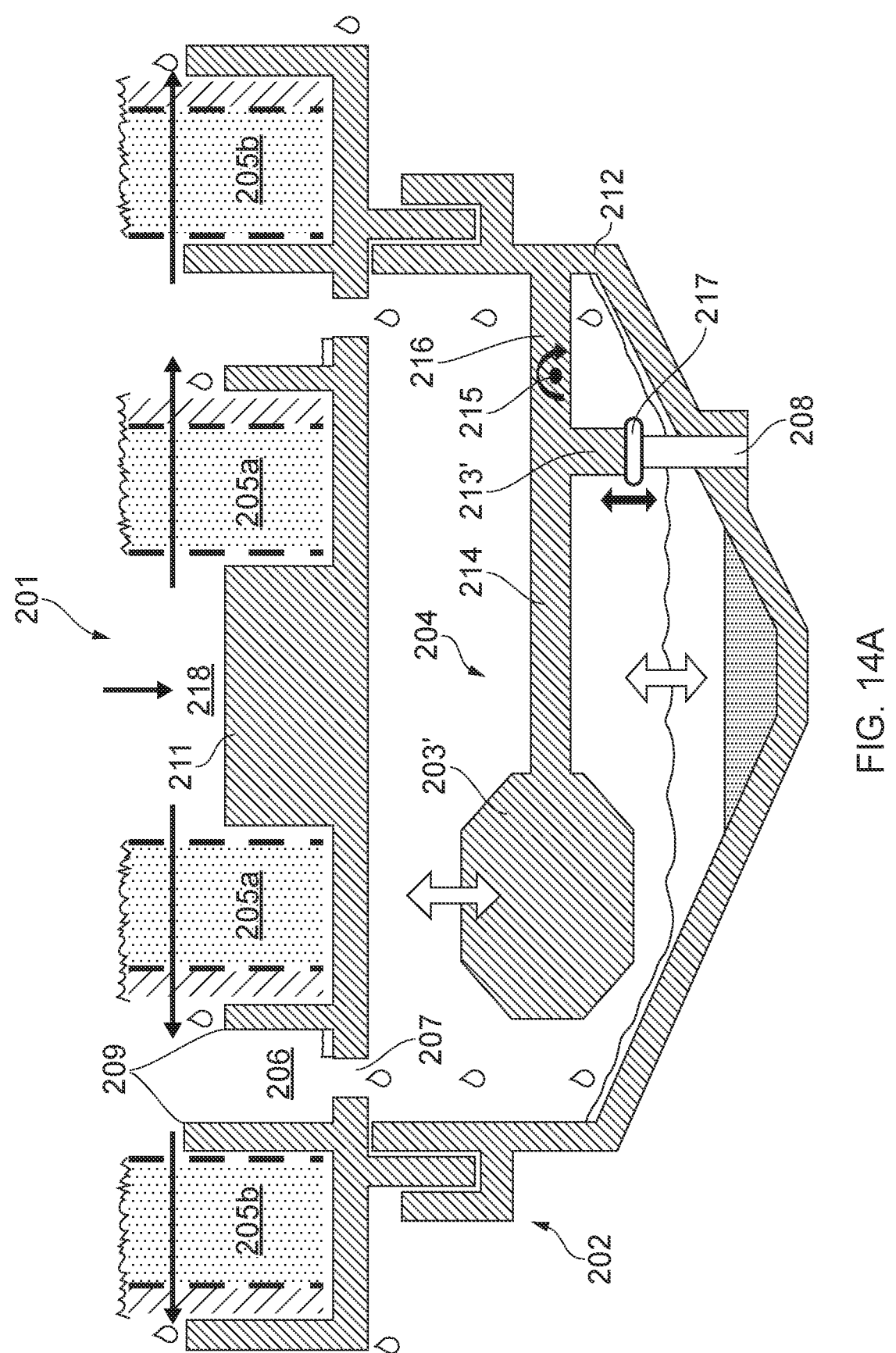
FIGS. 14A and 14B show a further variant of the multi-stage coalescing filter of FIG. 10 in different stages of its operation.
Figure 14B:
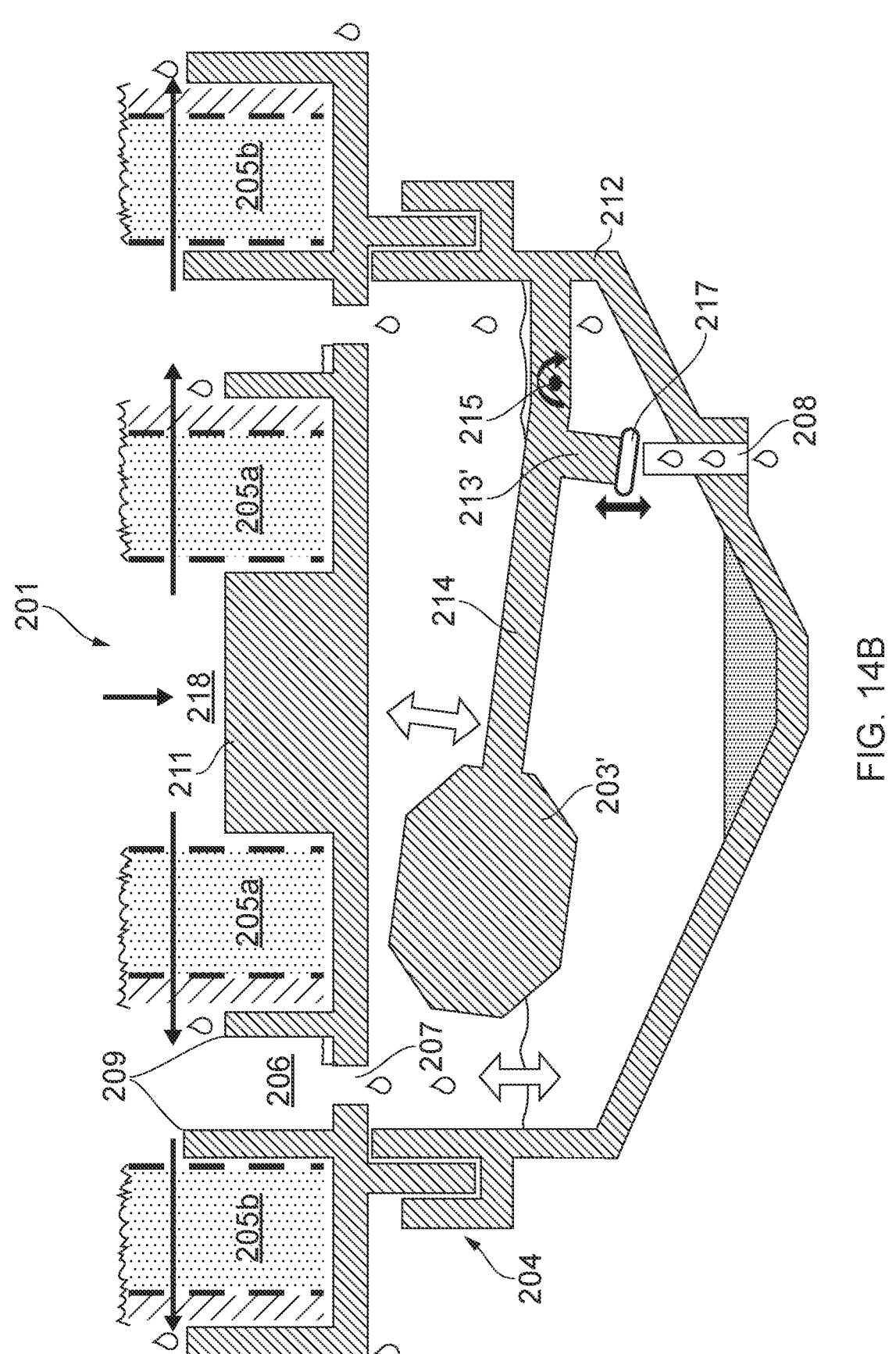

Finally, turning to FIGS. 14A and 14B, a further variant of the multi-stage coalescing filter of FIG. 10 having a different float valve 204' is shown. Here, the float valve has a flotation device 203', e.g. a bladder supported by a cantilever 214 to float on a surface of the collected oil. The cantilever is pitovably attached to a side wall of the reservoir 212 at an attachment position 215 and includes a control member 213' extending downwardly therefrom between the attachment position and the flotation device. The control member is sealable to a mouth of the drainage outlet 208 so as to close it (as shown in FIG. 14A) via a sealing element 217, such as an O-ring attached to the end of the control member, when the cantilever drops under downwards movement of the flotation device below a predetermined level. As shown in FIG. 14B, when the flotation device 203' lifts above the predetermined level, the cantilever pivots to lift the control member and thus exposes the mouth of the drainage outlet, thereby providing a path for flow of oil out of the reservoir through the drainage outlet. In this way, the level of coalesced liquid in the reservoir is reliably controlled.

Other drain mechanisms are also possible including conventional manual drain mechanisms, electronic auto-drain mechanisms, timed actuator-activated drain mechanisms, etc.

Advantageously, each of the multi-stage coalescing filters described above in relation to FIGS. 2 to 14B provides an oil-only escape route from the filter, thereby improving filtration efficiency.

The features disclosed in the description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example+/−10%.

All references referred to above are hereby incorporated by reference.

What is claimed is:

1. A multi-stage coalescing filter for separating coalesced liquid from an aerosol-containing gas stream, the multi-stage coalescing filter including:
   an end cap having a chamber formed within; and
   a plurality of coaxial, nested, tubular filter elements supported upright on the end cap;
   wherein:
   pairs of successive filter elements are spaced from each other such that the end cap between pairs of successive filter elements forms respective annular sumps for collection of coalesced liquid separated by the filter elements from the aerosol-containing gas stream as it passes radially through the nested filter elements;
   the chamber has one or more inlets in fluid communication with the or each sump for receiving the separated coalesced liquid from the sump, and further has one or more outlets (108, 108') for guiding the received coalesced liquid out of the filter; and
   the chamber houses a porous element which is configured to saturate under contact with the received coalesced liquid so as to allow the received coalesced liquid to flow through the porous element to the outlet while simultaneously preventing the aerosol-containing gas stream from passing through the chamber to bypass the nested filter elements.

2. The multi-stage coalescing filter according to claim 1, wherein a sump side of the or each inlet is fitted with a pre-filter element for purifying the separated coalesced liquid before it enters the chamber.

3. The multi-stage coalescing filter according to claim 1, wherein the chamber has plural inlets and/or outlets arranged in respective circumferential rows.

4. The multi-stage coalescing filter according to claim 1, wherein the end cap comprises a bottom portion which defines a floor of the chamber and the one or more outlets, and a top portion which defines a ceiling of the chamber and the one or more inlets, the top portion being removably couplable to the bottom portion to allow location of the porous element in the chamber.

5. The multi-stage coalescing filter according to claim 4, wherein the floor and/or ceiling of the chamber include one or more spaced projections extending into the chamber.

6. The multi-stage coalescing filter according to claim 1, wherein the end cap provides a respective pair of annular side walls for the or each sump, the side walls extending up opposing sides of the respective pair of successive tubular filter elements to isolate the coalesced liquid collected in the sump from the filter elements.

7. The multi-stage coalescing filter according to claim 6, wherein the annular side walls have different heights.

8. The multi-stage coalescing filter according to claim 6, wherein the end cap comprises a bottom portion which defines a floor of the chamber and the one or more outlets, and a top portion which defines a ceiling of the chamber and the one or more inlets, the top portion being removably couplable to the bottom portion to allow location of the porous element in the chamber, and wherein one of the annular side walls of a given sump is formed by the top portion and the other of the annular side walls of the given sump is formed by the bottom portion.

9. The multi-stage coalescing filter according to claim 6, wherein the end cap comprises a bottom portion which defines a floor of the chamber and the one or more outlets, and a top portion which defines a ceiling of the chamber and the one or more inlets, the top portion being removably couplable to the bottom portion to allow location of the porous element in the chamber, and wherein both of the annular side walls of at least one of the sumps are formed by the top portion.

10. The multi-stage coalescing filter according to claim 1, wherein the end cap is a first end cap having a central port for communicating the gas stream with the inside of the innermost tubular filter element, and wherein the multi-stage coalescing filter further has a second end cap at the opposite ends of the tubular filter elements to the first end cap to close off said opposite ends.

11. The multi-stage coalescing filter according to claim 1, wherein the porous element is formed of any one or any combination of: glass fibre, synthetic fibre matrix, foam, non-woven material, and sintered material such as sintered plastic.

12. A coalesced liquid separator including:

the multi-stage coalescing filter according to claim 1; and a housing containing the filter;

wherein the housing has an inlet arrangement for receiving an aerosol-containing gas stream and directing it to the coaxial, nested, tubular filter elements for separation of coalesced liquid therefrom, and the housing has an outlet arrangement for collecting the filtered gas stream leaving the coaxial, nested, tubular filter elements and exiting it from the separator.

13. The coalesced liquid separator according to claim 12, wherein the separator is configured so that, in use, between an upper position at the top surface of coalesced liquid collected in the sumps and a lower position at the outlets from the chamber, there is a pressure differential in addition to any hydraulic head in the coalesced liquid between the upper and lower positions, the pressure differential being such as to drive the coalesced liquid from the sump and through the chamber.

\* \* \* \* \*